US011184304B2

(12) United States Patent
Goenka et al.

(10) Patent No.: US 11,184,304 B2
(45) Date of Patent: *Nov. 23, 2021

(54) PRESENTING AND SHARING AUGMENTED REALITY OBJECTS

(71) Applicant: Verizon Patent and Licensing Inc., Basking Ridge, NJ (US)

(72) Inventors: Mohit Goenka, Santa Clara, CA (US); Ashish Khushal Dharamshi, Sunnyvale, CA (US); Nikita Varma, Milpitas, CA (US); Gnanavel Shanmugam, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,663

(22) Filed: Feb. 1, 2021

(65) Prior Publication Data

US 2021/0160204 A1 May 27, 2021

Related U.S. Application Data

(63) Continuation of application No. 16/233,519, filed on Dec. 27, 2018, now Pat. No. 10,911,381.

(51) Int. Cl.
*G06F 15/16* (2006.01)
*H04L 12/58* (2006.01)
(Continued)

(52) U.S. Cl.
CPC ............ *H04L 51/10* (2013.01); *G06T 15/205* (2013.01); *G06T 19/006* (2013.01); *H04L 67/38* (2013.01)

(58) Field of Classification Search
CPC ......... H04L 51/10; H04L 67/38; H04L 51/22; G06T 15/205; G06T 19/006
See application file for complete search history.

(56) References Cited

U.S. PATENT DOCUMENTS

| 7,272,815 B1 * | 9/2007 | Eldridge | G06F 8/71 |
| | | | 707/999.009 |
| 2014/0132484 A1 * | 5/2014 | Pandey | G06T 19/006 |
| | | | 345/8 |

(Continued)

OTHER PUBLICATIONS

NPL, Screen capture from YouTube Video Clip entitled "IKEA Place," 8 pages, uploaded on Sep. 12, 2017 by user IKEA. Retrieved from Internet: "www.youtube.com/watch?v=UudV1VdFtuQ", hereinafter IKEA Place (Year: 2017).*

*Primary Examiner* — Padma Mundur

(57) ABSTRACT

One or more computing devices, systems, and/or methods for presenting augmented reality (AR) experiences and/or sharing AR objects are provided. For example, a request to initiate an AR experience may be received from a device associated with an email account. A real time view of a camera of the device may be displayed using an AR interface, where a set of AR objects are overlaid onto the real time view of the camera. An edited set of AR objects may be generated based upon one or more inputs corresponding to one or more edits to the set of AR objects. The edited set of AR objects may be overlaid onto the real time view of the camera. An email comprising the edited set of AR objects may be transmitted to one or more email accounts responsive to receiving a second request to share the edited set of AR objects.

20 Claims, 16 Drawing Sheets

(51) Int. Cl.
    *G06T 15/20*    (2011.01)
    *G06T 19/00*    (2011.01)
    *H04L 29/06*    (2006.01)

(56) References Cited

U.S. PATENT DOCUMENTS

2015/0178993 A1*  6/2015  Skarulis ................ G06T 19/006
                                                                                 345/633
2015/0187108 A1*  7/2015  Mullins ................... G06T 11/60
                                                                                 345/633
2019/0311341 A1* 10/2019  Rice ....................... H04L 9/3239

\* cited by examiner

PRESENTING AND SHARING AUGMENTED REALITY OBJECTS

CROSS REFERENCE TO RELATED APPLICATION

This application claims priority to and is a continuation of U.S. application Ser. No. 16/233,519, filed on Dec. 27, 2018, entitled "PRESENTING AND SHARING AUGMENTED REALITY OBJECTS", which is incorporated by reference herein in its entirety.

BACKGROUND

Many applications may allow a user and/or a client device associated with the user to consume augmented reality (AR) experiences associated with AR objects. However, other users may not be able to access AR objects associated with the user.

SUMMARY

In accordance with the present disclosure, one or more computing devices and/or methods are provided. In an example, a graphical user interface of a first client device, associated with a first email account, may be controlled to display a first email interface comprising a first email. A request to initiate an augmented reality (AR) experience associated with a set of AR objects may be received via a selection of a first selectable input comprised within the first email. Responsive to receiving the request to initiate the AR experience, an AR interface may be opened using the first client device. A real time view of a camera of the first client device may be displayed using the AR interface. The set of AR objects may be overlaid onto the real time view of the camera. One or more inputs corresponding to one or more edits to the set of AR objects may be received. An edited set of AR objects may be generated based upon the set of AR objects and/or the one or more inputs. The edited set of AR objects may be overlaid onto the real time view of the camera. A second request to share the edited set of AR objects with one or more email accounts may be received. Responsive to receiving the second request to share the edited set of AR objects with the one or more email accounts, one or more emails may be transmitted to the one or more email accounts. The edited set of AR objects may be accessible via each email of the one or more emails.

In an example, a graphical user interface of a first client device, associated with a first user account, may be controlled to display a first communication interface comprising a first message. A request to initiate an AR experience associated with a set of AR objects may be received via a selection of a first selectable input comprised within the first message. Responsive to receiving the request to initiate the AR experience, an AR interface may be opened using the first client device. A real time view of a camera of the first client device may be displayed using the AR interface. The set of AR objects may be overlaid onto the real time view of the camera. A second request to share the set of AR objects with one or more user accounts may be received. Responsive to receiving the second request to share the set of AR objects with the one or more user accounts, one or more messages may be transmitted to the one or more user accounts. The set of AR objects may be accessible via each message of the one or more messages.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
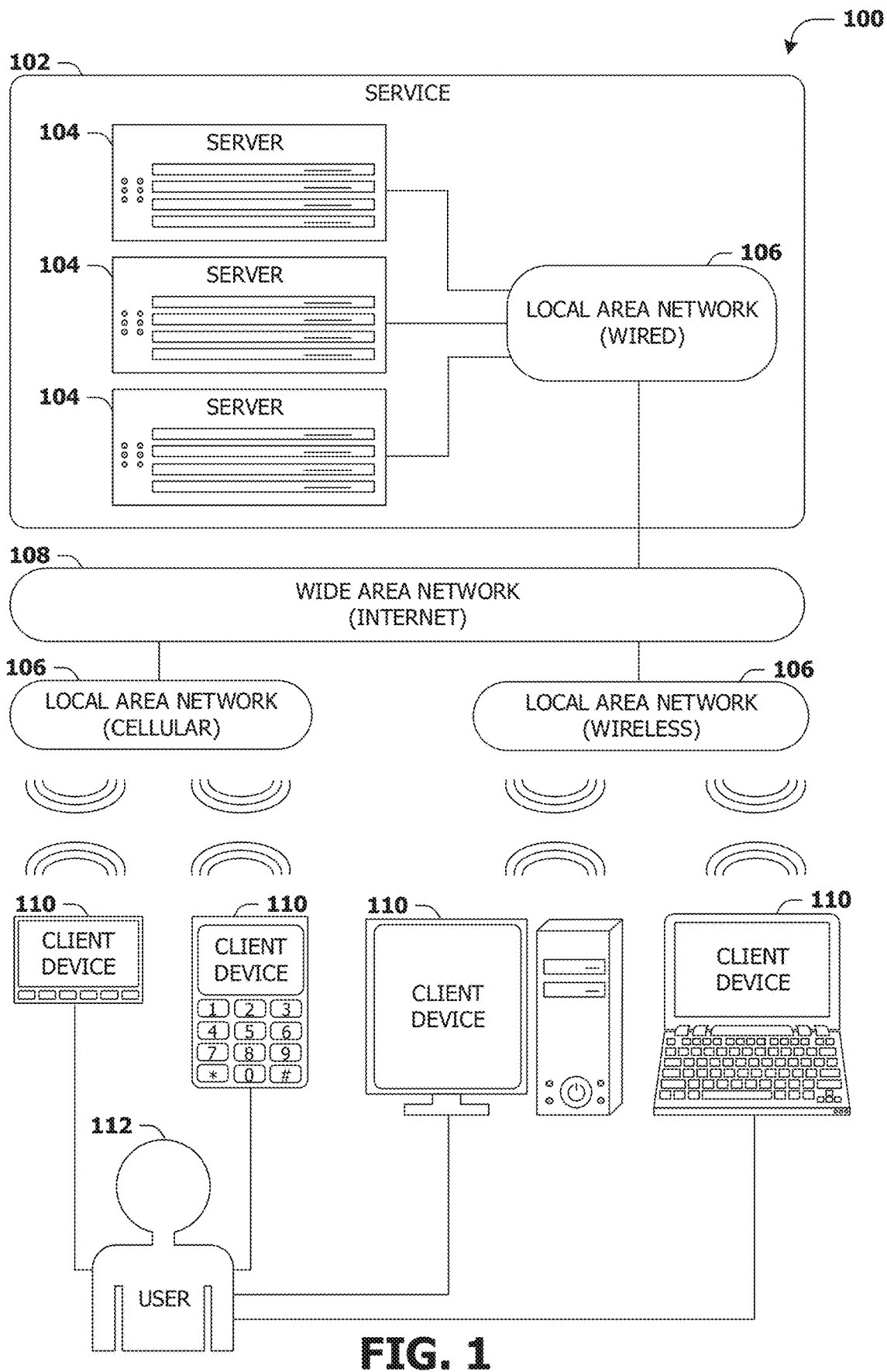
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
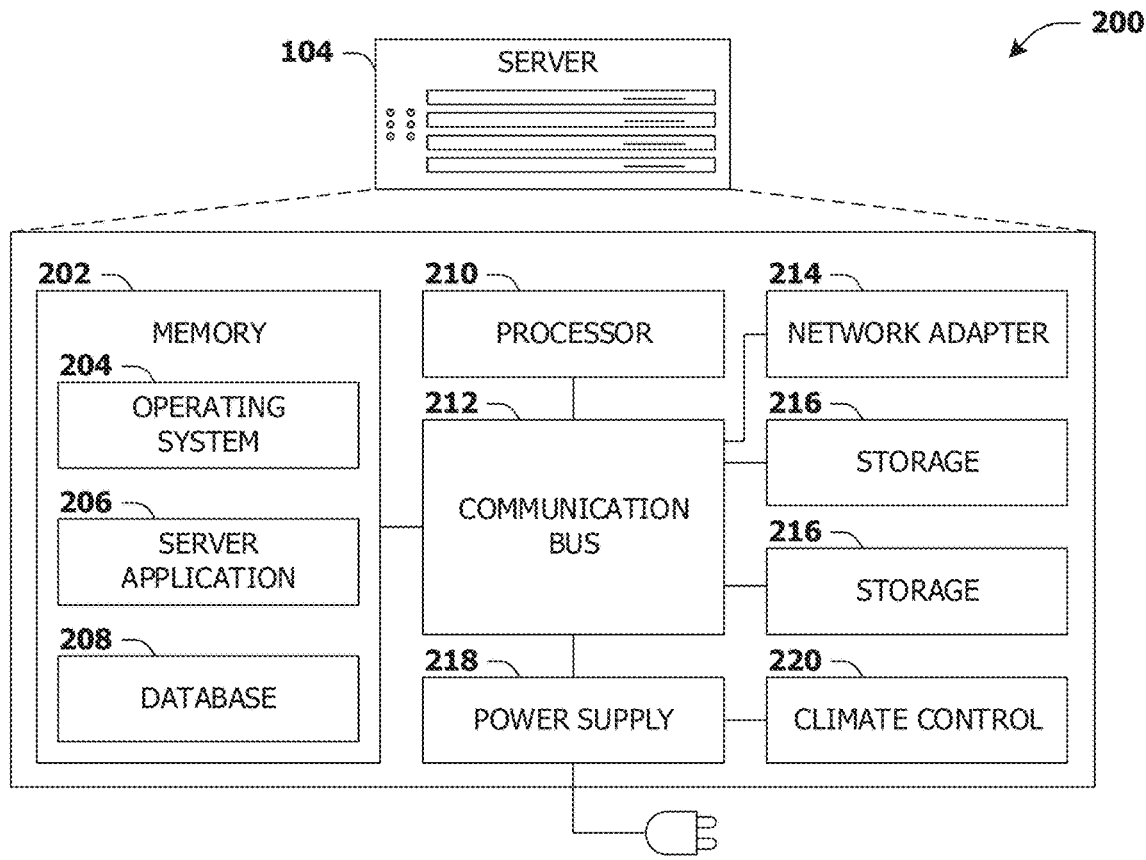
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
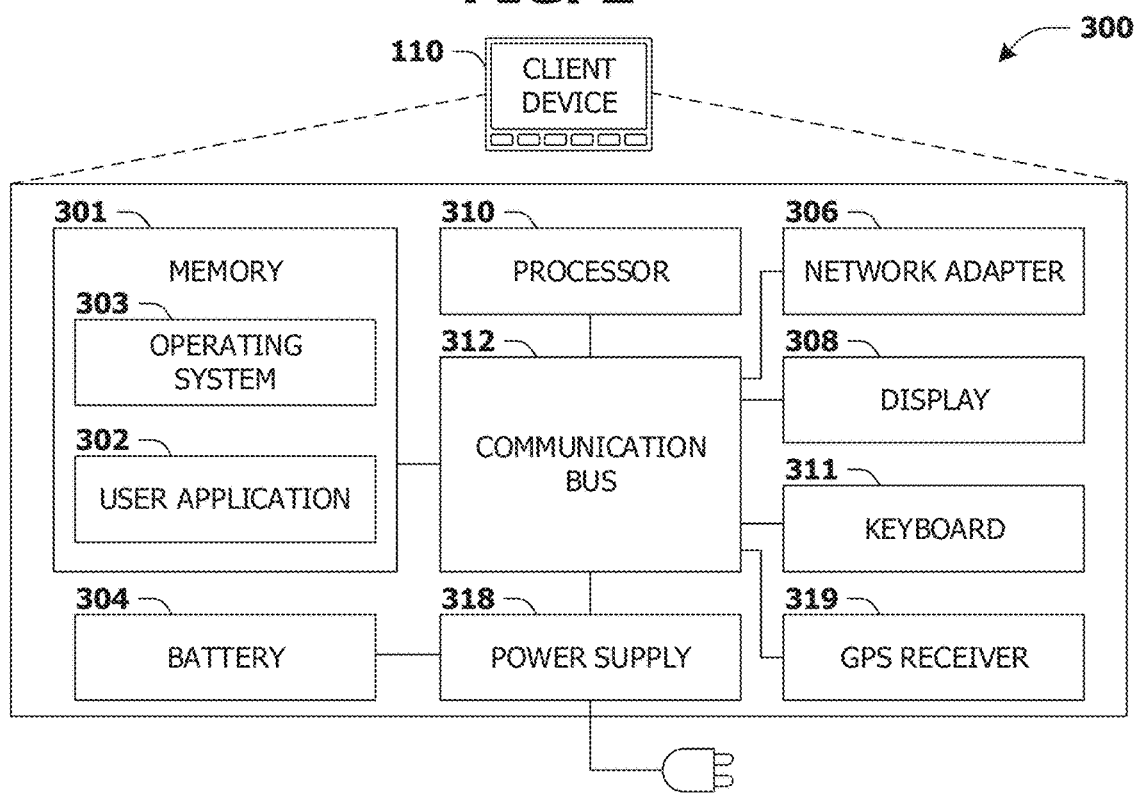
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for presenting augmented reality (AR) experiences and/or sharing AR objects are provided. For example, a user (and/or a client device associated with the user) may access and/or interact with an application that may provide AR experiences associated with AR objects. For example, the application may display a view of a physical surrounding of the user and/or the client device, where one or more AR objects are overlaid onto the view. However, the user may want to share the one or more AR objects with other devices. Alternatively and/or additionally, the user may want to edit the one or more AR objects (e.g., make modifications to the one or more AR objects, such as by changing a color of the one or more AR objects, changing a size of the one or more AR objects, etc.) and/or share one or more edited versions of the one or more AR objects.

Thus, in accordance with one or more of the techniques presented herein, a request to initiate an AR experience may be received via a selection of a selectable input of a communication interface. Responsive to receiving the request, an AR interface may be opened and/or a set of AR objects may be overlaid onto a real time view of a camera of the client device. The set of AR objects may be edited using the AR interface to generate an edited set of AR objects. Alternatively and/or additionally, the set of AR objects and/or the edited set of AR objects may be shared with one or more user accounts using the AR interface and/or the communication interface.

Figure 4:
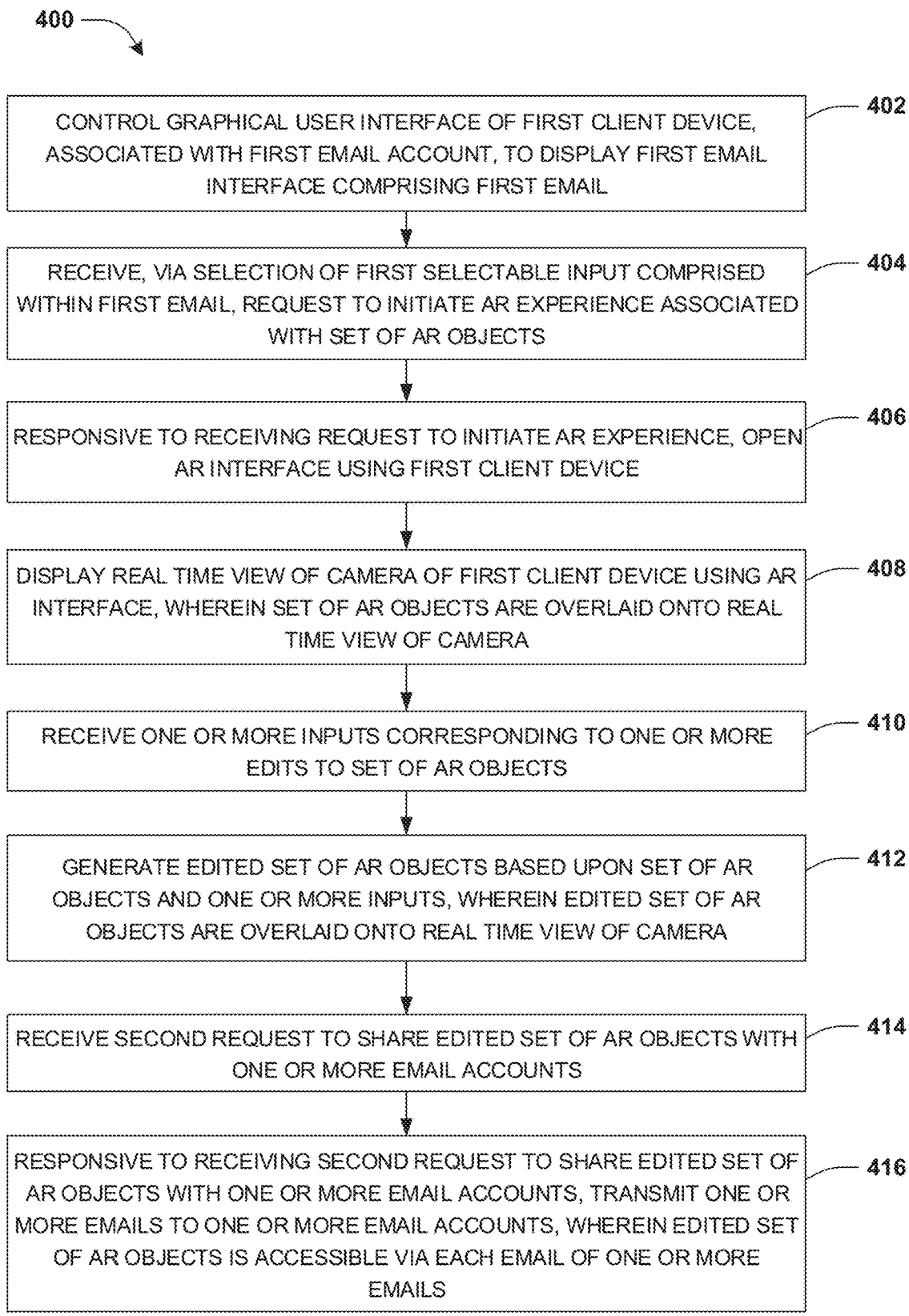
FIG. 4 is a flow chart illustrating an example method for presenting AR experiences and/or sharing AR objects.

An embodiment of presenting AR experiences and/or sharing AR objects is illustrated by an example method 400 of FIG. 4. A first user, such as user Jill, and/or a first client device associated with the first user may access and/or interact with a communication system (e.g., an email system, messaging system, etc.) for sending and/or receiving emails and/or performing communications via messaging, voice calls, video calls, etc. For example, a first email account (and/or a different type of user account) of the first user with the communication system may be accessed and/or interacted with via a first email interface, such as one or more of an email client, a web email interface accessed via a browser, an email application, etc. on the first client device. In some examples, the first email interface may be AR enabled (e.g., the first email interface may provide a first AR interface which may be used to present AR experiences and/or AR objects). In some examples, the communication system (and/or the first email interface) may be associated with an email service provider (and/or a different type of communication service provider).

In some examples, the first email account may receive a first email. The first email may be received from a second email account. For example, the second email account may be associated with a user that is an acquaintance of the first user. Alternatively and/or additionally, the second email account may be associated with a first entity (e.g., a company, a business, an organization, a brand, etc.). For example, the first email account may be subscribed to a subscription service associated with the first entity. For example, emails (e.g., emails comprising promotional content, product information, news content, entertainment content, etc.) comprising the first email may be received by the first email account from the second email account.

At 402, a graphical user interface of the first client device may be controlled to display the first email interface comprising the first email. The graphical user interface of the first client device may be controlled to display the first email responsive to receiving a request to open (e.g., access, display, etc.) the first email. For example, the request to open the first email may be received via the first email interface. The first email interface may display a list of emails (e.g., an inbox associated with the first email account) comprising a plurality of email representations. For example, responsive to a selection of a first email representation corresponding to the first email, the first email may be displayed by the first email interface.

In some examples, the first email may comprise a first selectable input corresponding to initiating a first AR experience associated with a first set of AR objects (e.g., a set of one or more AR objects). For example, the first selectable input may correspond to a first AR experience package corresponding to the first set of AR objects. In some examples, the first AR experience package may be a file comprising first AR data corresponding to the first set of AR objects. For example, the first AR data (and/or the first AR experience package) may comprise data (e.g., 2-dimensional and/or 3-dimensional modeling data, AR modeling data, etc.) corresponding to each object of the first set of AR objects, which may be used by the first client device to render the first set of AR objects.

In some examples, the first set of AR objects may comprise a representation of one or more products (which may be associated with the first entity). Alternatively and/or additionally, the first set of AR objects may comprise a representation of one or more objects associated with entertainment. For example, the first set of AR objects may comprise a representation of one or more of one or more home furniture items (e.g., a couch, a nightstand, a coffee table, a television, a table, etc.), one or more clothing accessories (e.g., a handbag, a shirt, etc.), one or more entertainment figures (e.g., an actor, a character from a movie, etc.), one or more art items (e.g., a painting, a sculpture, etc.), one or more cars, one or more buildings, one or more toys (e.g., a teddy bear), one or more animals (e.g., a dinosaur, a giraffe, etc.), etc.

For example, the first AR experience package may be an attachment of the first email. Responsive to a selection of the first selectable input, the first AR experience package may be downloaded (from a server hosting the first email, for example) to the first client device and/or opened using the first client device. Alternatively and/or additionally, the first selectable input may correspond to a download link. Responsive to a selection of the first selectable input, the first AR experience package may be downloaded to the first client device (from a server associated with the download link) and/or opened using the first client device.

At 404, a request to initiate the first AR experience may be received via a selection of the first selectable input. The first AR experience package may be downloaded to the first client device responsive to the selection of the first selectable input. At 406, responsive to receiving the request to initiate the first AR experience (and/or responsive to downloading the first AR experience package to the first client device), the first AR interface, associated with the first email interface, may be opened using the first client device.

In some examples, the first AR interface may be opened automatically responsive to receiving the request to initiate the first AR experience and/or responsive to downloading the first AR experience package to the first client device. For example, the first AR interface may be a part of the first email interface (e.g., the first AR interface may be a module, a component, plugin, etc. of the first email interface). The first AR experience package may comprise an indication of the first AR interface. For example, the first AR interface may be opened responsive to the indication of the first AR interface being identified. For example, the first AR experience package may comprise first instructions, that when executed using the first email interface and/or the first client device, may cause the first AR interface to be opened in association with the first AR experience package (e.g., the first AR experience package may be opened using the first AR interface).

At 408, the first AR interface may be used to display a real time view of a first camera of the first client device. For example, the first set of AR objects may be overlaid onto the real time view of the first camera. In some examples, prior to overlaying the first set of AR objects onto the real time view of the first camera, the first AR interface may perform one or more steps for implementing the first AR experience.

For example, a first step may comprise initializing the first AR interface. A first instruction (corresponding to the first step) may be overlaid onto the real time view of the first camera of the first client device, directing the first user to hold the first client device and/or the first camera steadily (e.g., the first instruction may comprise "Initializing, hold phone steadily").

In some examples, upon completion of the first step, a second step may begin. For example, the second step may comprise a first part of detecting a plane (e.g., corresponding to a wall, a floor, a surface of an object, etc.) and/or mapping a surface. A second instruction (e.g., corresponding to the second step) may be overlaid onto the real time view of the first camera of the first client device, directing the first user to move the first client device and/or the first camera in one or more directions (e.g., the second instruction may comprise "Detecting surface, move phone slowly"). In some examples, one or more first graphics may be overlaid onto the real time view of the camera of the first client device to assist the first user to perform the second instruction (e.g., the one or more first graphics may comprise a first representation of a phone moving in the one or more directions).

In some examples, upon completion of the second step, a third step may begin. The third step may comprise a second part of detecting the plane and/or mapping the surface. A third instruction (e.g., corresponding to the third step) may be overlaid onto the real time view of the first camera of the first client device, directing the first user to move the first client device and/or the first camera in one or more directions and/or to point the first client device and/or the first camera at one or more places (e.g., the third instruction may comprise "Point close to the surface, move phone as shown until tiles disappear"). In some examples, one or more second graphics may be overlaid onto the real time view of the first camera of the device to assist the first user to perform the third instruction (e.g., the one or more second graphics may comprise a second representation of a phone moving in one or more directions and/or a set of tiles overlaid onto the plane and/or the surface).

In some examples, upon completion of the third step, the third instruction may be removed (e.g., no longer overlaid onto the real time view of the first camera of the first client device) and/or a fourth instruction may be overlaid onto the real time view of the first camera of the first client device, directing the first user to select a location on the real time view of the first camera of the first client device for placement of the first set of AR objects (e.g., the fourth instruction may comprise "Tap to place object"). For example, responsive to a selection of a location on the real time view of the first camera, the first set of AR objects may be overlaid onto the real time view of the first camera (at the location).

In some examples, a first perspective of the first set of AR objects may be modified to a second perspective of the first set of AR objects responsive to a change of the real time view of the first camera of the first client device and/or one or more user interactions with the first AR interface. For example, as a position of the first camera changes and/or as the first camera moves, a line of sight of the first camera may change and/or a perspective of the first set of AR objects overlaid onto the real time view of the first camera may change (e.g., if the first camera moves in a first direction, a first side of the first set of AR objects may be displayed and/or if the first camera moves in a second direction, a second side of the first set of AR objects may be displayed).

Alternatively and/or additionally, the location of the first set of AR objects may be modified to a second location responsive to one or more user interactions. In some examples, the first set of AR objects may be dragged using a touchscreen of the first client device from the location to the second location. Alternatively and/or additionally, merely a single AR object of the first set of AR objects may be moved from a first exemplary location to a second exemplary location by dragging the single AR object from the first exemplary location to the second exemplary location.

At 410, one or more first inputs, corresponding to one or more edits to the first set of AR objects may be received (via the first AR interface). In some examples, the first AR interface may comprise a first plurality of edit selectable inputs corresponding to editing the first set of AR objects. The first plurality of edit selectable inputs may correspond to buttons (e.g., selectable graphical objects displayed using the first AR interface). For example, the one or more first inputs may correspond to one or more selections of one or more selectable inputs of the first plurality of edit selectable inputs. Alternatively and/or additionally, the one or more first inputs may correspond to one or more interactions with the first AR interface.

For example, a first exemplary interaction with the first AR interface may comprise swiping the touchscreen with a single finger, which may correspond to a first exemplary edit to the first set of AR objects. A second exemplary interaction with the first AR interface may comprise swiping the touchscreen with more than one finger, which may correspond to a second exemplary edit to the first set of AR objects. A third exemplary interaction with the first AR interface may comprise tapping the touchscreen once, which may correspond to a third exemplary edit to the first set of AR objects. A fourth exemplary interaction with the first AR interface may comprise tapping the touchscreen more than one time, consecutively (e.g., double-tapping), which may correspond to a fourth exemplary edit to the first set of AR objects.

In some examples, a first input of the one or more first inputs may correspond to adding an additional AR object to the first set of AR objects. The first input may be received via a selection of one or more selectable inputs of the first plurality of edit selectable inputs. For example, the first AR interface may display a first selectable input corresponding to adding one or more additional AR objects to the first set of AR objects. Alternatively and/or additionally, responsive to a selection of the first selectable input, a list of additional AR objects may be displayed. For example, the list of additional AR objects may comprise a first set of selectable inputs corresponding to a set of additional AR objects. For example, a second selectable of the first set of selectable inputs may correspond to the additional AR object. Responsive to a selection of the second selectable input, the additional AR object may be added to the first set of AR objects.

Alternatively and/or additionally, the additional AR object may comprise a representation of a first set of text (e.g., a message). For example, the first set of selectable inputs may comprise one or more text selectable inputs corresponding to generating the first set of text. For example, responsive to a selection of a selectable input of the one or more text selectable inputs, a text area may be displayed. The first set of text may be entered into the text area. Alternatively and/or additionally, a size, font, color, etc. of the representation of the first set of text may be configured using the one or more text selectable inputs.

In a first example, the first set of AR objects may correspond to a set of family room furniture. For example, the first set of AR objects may comprise a first exemplary AR object comprising a representation of a couch (e.g., a sofa) and/or a second exemplary AR object comprising a representation of a coffee table (e.g., the first set of AR objects may be configured such that the coffee table is positioned in front of the couch). Alternatively and/or additionally, the first set of AR objects may comprise a third exemplary AR object comprising a representation of a logo associated with the first entity (e.g., the logo may be associated with the brand of the first entity). Alternatively and/or additionally, the additional AR object may comprise a representation of a pillow set for the set of family room furniture (e.g., the second selectable input may correspond to the pillow set). For example, the set of additional AR objects may comprise an AR object corresponding to the representation of the pillow set, an AR object corresponding to a representation of a side table, a representation corresponding to a representation of a couch rug, etc.

In a second example, the first set of AR objects may correspond to a teddy bear. For example, the first set of AR objects may comprise a fourth exemplary AR object comprising a representation of the teddy bear. Alternatively and/or additionally, the additional AR object may comprise a representation of the first set of text (e.g., "This teddy bear is so cute"). For example, the first set of text may be entered into the text area and/or a size, font, color, etc. of the representation of the first set of text may be configured using the one or more text selectable inputs. Alternatively and/or additionally, a location of the additional AR object (e.g., the representation of the first set of text) may be controlled by interacting with the first AR interface (e.g., by using the one or more text selectable inputs, by placing a finger on the additional AR object and/or dragging the additional AR object to a desired location, etc.).

In some examples, a second input of the one or more first inputs may correspond to removing an AR object from the first set of AR objects. For example, the second input may be received via a selection of one or more selectable inputs of the first plurality of edit selectable inputs. For example, the first AR interface may display a third selectable input corresponding to entering an AR object removal mode. For example, when the first AR interface is in AR object removal mode, responsive to the first user tapping on an AR object of the first set of AR objects, the AR object may be removed from the first set of AR objects. Alternatively and/or additionally, rather than entering the AR object removal mode, an AR object may be removed from the first set of AR objects by pressing on the AR object (e.g., pressing, for a few seconds, a finger on a portion of the touchscreen where the AR object is displayed) and/or dragging the AR object (e.g., the AR object may be dragged upwards, downwards, to the left, to the right, etc. in order to remove the AR object from the first set of AR objects). Alternatively and/or additionally, an AR object may be removed from the first set of AR objects by tapping on the AR object more than one time, consecutively.

In the first example (where the first set of AR objects corresponds to the set of family room furniture), the second exemplary AR object (e.g., the representation of the coffee table) may be removed from the first set of AR objects. For example, responsive to a selection of the third selectable input, the first AR interface may enter the AR object removal mode. The second exemplary AR object may be removed from the first set of AR objects responsive to a selection of the second exemplary AR object.

In some examples, a third input of the one or more first inputs may correspond to changing a color of one or more AR objects of the first set of AR objects. The third input may be received via a selection of one or more selectable inputs of the first plurality of edit selectable inputs. For example, the first AR interface may display a fourth selectable input corresponding to changing a color of one or more AR objects of the first set of AR objects. For example, responsive to a selection of the fourth selectable input, a list of colors may be displayed. For example, the list of colors may comprise a second set of selectable inputs corresponding to a set of colors. For example, a fifth selectable input of the second set of selectable inputs may correspond to a first color. Responsive to a selection of the fifth selectable input, the first set of AR objects may be changed to the first color.

Alternatively and/or additionally, after the fourth selectable input is selected, one or more AR objects of the first set of AR objects may be selected (using the first AR interface). Merely the one or more AR objects may be changed from one or more colors of the one or more AR objects to the first color responsive to a selection of the fifth selectable input.

In the first example (where the first set of AR objects corresponds to the set of family room furniture), colors of the first set of AR objects may be changed to the first color. For example, responsive to a selection of the fourth selectable input, the list of colors may be displayed. Responsive to a selection of the fifth selectable input of the second set of selectable inputs, the first set of AR objects may be changed to the first color (e.g., brown, zig-zag pattern, striped pattern, etc.). Alternatively and/or additionally, merely the first exemplary AR object (e.g., the representation of the couch) may be changed from a second color (e.g., grey) of the first exemplary AR object to the first color (e.g., the first exemplary AR object may be selected such that rather than changing every AR object of the first set of AR objects to the first color, merely the first exemplary AR object may be changed to the first color).

In some examples, a fourth input of the one or more first inputs may correspond to changing a size of one or more AR objects of the first set of AR objects. The fourth input may be received via a selection of one or more selectable inputs of the first plurality of edit selectable inputs. For example, the first AR interface may display a sixth selectable input corresponding to changing a size of an AR object of the first set of AR objects. For example, responsive to a selection of the sixth selectable input and/or a selection of an AR object of the first set of AR objects, a list of sizes corresponding to the AR object may be displayed. For example, the list of sizes may comprise a third set of selectable inputs corresponding to a set of sizes. For example, a seventh selectable input of the third set of selectable inputs may correspond to a first size. Responsive to a selection of the seventh selectable input, the AR object of the first set of AR objects may be changed from a second size to the first size.

Alternatively and/or additionally, responsive to a selection of the seventh selectable and/or a selection of an AR object of the first set of AR objects, a size module may be displayed. For example, the size module may be one or more of a widget, a scrollbar, a slider, a track bar, etc. which may be used to adjust and/or change an AR object size of the AR object (e.g., the AR object may be changed from the second size to the first size using the size module).

In the first example (where the first set of AR objects corresponds to the set of family room furniture), the first exemplary AR object (e.g., the representation of the couch) may be changed from a first exemplary size to a second exemplary size. For example, responsive to a selection of the sixth selectable input and/or a selection of the first exemplary AR object, an exemplary list of sizes corresponding to the first exemplary AR object may be displayed. For example, the exemplary list of sizes may comprise an exemplary set of selectable inputs corresponding to an exemplary set of sizes. For example, each size of the exemplary set of sizes may correspond to a (standard) couch size that the first entity provides to customers (e.g., the first entity may manufacture the couch in each size of the exemplary set of sizes). Responsive to a selection of a selectable input corresponding to the second exemplary size, the first exemplary AR object may be changed from the first exemplary size to the second exemplary size.

In some examples, at least one input of the one or more first inputs may correspond to changing one or more other settings (e.g., settings other than color or size) of one or more AR objects of the first set of AR objects. Other settings may correspond to, for example, cropping, rotating, flipping, etc.

At 412, a first edited set of AR objects may be generated based upon the first set of AR objects and/or the one or more first inputs. For example, the first edited set of AR objects may be generated responsive to receiving the one or more first inputs. For example, the one or more first inputs may correspond to adding the additional AR object. Accordingly, the additional AR object may be added to the first set of AR objects to generate the first edited set of AR objects.

Alternatively and/or additionally, the one or more first inputs may correspond to removing an AR object from the first set of AR objects. Accordingly, the AR object may be removed from the first set of AR objects to generate the first edited set of AR objects. Alternatively and/or additionally, the one or more first inputs may correspond to changing one or more colors of one or more AR objects of the first set of AR objects. Accordingly, the one or more colors of the one or more AR objects may be changed to generate the first edited set of AR objects. Alternatively and/or additionally, the one or more first inputs may correspond to changing one or more sizes of one or more AR objects of the first set of AR objects. Accordingly, the one or more sizes of the one or more AR objects may be changed to generate the first edited set of AR objects.

In some examples, inputs of the one or more first inputs (corresponding to the one or more edits to the first set of AR objects) may be received separately. For example, each time that an input of the one or more first inputs is received, an edit corresponding to the input may be performed and/or a version of the first edited set of AR objects may be generated. For example, the first input (corresponding to adding the additional AR object to the first set of AR objects) may be received prior to receiving other inputs of the one or more first inputs. For example, a first version of the first edited set of AR objects may be generated responsive to receiving the first input (e.g., the first version of the first edited set of AR objects may comprise the addition AR object).

Alternatively and/or additionally, the second input (corresponding to removing an AR object from the first version of the first edited set of AR objects) may be received after receiving the first input. A second version of the first edited set of AR objects may be generated responsive to receiving the second input (e.g., the second version of the first edited set of AR objects may not comprise the (removed) AR object).

Alternatively and/or additionally, the third input (corresponding to changing one or more colors of one or more AR objects of the second version of the first edited set of AR objects) may be received (after receiving the second input). A third version of the first edited set of AR objects may be generated responsive to receiving the third input (e.g., the third version of the first edited set of AR objects may include color changes associated with the third input).

Alternatively and/or additionally, the fourth input (corresponding to changing one or more sizes of one or more AR objects of the third version of the first edited set of AR objects) may be received (after receiving the third input). A fourth version of the first edited set of AR objects may be generated responsive to receiving the fourth input (e.g., the third version of the first edited set of AR objects may include size changes associated with the fourth input).

In some examples, a final version of the first edited set of AR objects may correspond to a version of the first edited set of AR objects generated based upon a last received input of the one or more first inputs. For example, if no inputs corresponding to edits to the first set of AR objects are received after the fourth input, the fourth version of the first edited set of AR objects may correspond to the final version of the first edited set of AR objects. It may be appreciated that the inputs of the one or more first inputs may be received in a plurality of different orders, and that the example of the first input being followed by the second input being followed by the third input being followed by the fourth input is merely illustrative.

At 414, a request to share the first edited set of AR objects with one or more email accounts may be received. For example, indications of the one or more email accounts (e.g., email addresses corresponding to the one or more email accounts) may be received via the first AR interface and/or the first email interface. The request to share the first edited set of AR objects may be received responsive to a selection of a share selectable input of the first AR interface. Alternatively and/or additionally, responsive to a selection of the share selectable input of the first AR interface, one or more emails may be generated (automatically) for transmission to the one or more email accounts.

Alternatively and/or additionally, responsive to a selection of the share selectable input of the first AR interface, a list of sharing options may be displayed. For example, the list of sharing options may comprise a set of sharing selectable inputs corresponding to one or more sharing options.

For example, an eighth selectable input of the set of sharing selectable inputs may correspond to a first sharing option. The first sharing option may correspond to sharing a second AR experience package corresponding to the first set of AR objects (e.g., the second AR experience package may be the same as the first AR experience package). Alternatively and/or additionally, responsive to a selection of the eighth selectable input, the second AR experience package may be selected for inclusion in the one or more emails.

Alternatively and/or additionally, the second AR experience package may be selected for inclusion in the one or more emails automatically (without a selection of the eighth selectable input).

Alternatively and/or additionally, a ninth selectable input of the set of sharing selectable inputs may correspond to a second sharing option. The second sharing option may correspond to sharing a third AR experience package corresponding to the first edited set of AR objects. For example, the third AR experience package may be a file comprising second AR data corresponding to the first edited set of AR objects (e.g., the final version of the first edited set of AR objects). In some examples, responsive to a selection of the ninth selectable input, the third AR experience package may be generated based upon the first edited set of AR objects (e.g., the final version of the first edited set of AR objects). Alternatively and/or additionally, responsive to a selection of the ninth selectable input, the third AR experience package may be selected for inclusion in the one or more emails. Alternatively and/or additionally, the third AR experience package may be generated and/or selected for inclusion in the one or more emails automatically (without a selection of the ninth selectable input).

Alternatively and/or additionally, a tenth selectable input of the set of sharing selectable inputs may correspond to a third sharing option. The third sharing option may correspond to sharing a first image of the first set of AR objects. In some examples, responsive to a selection of the tenth selectable input, the first image of the first set of AR objects may be generated. For example, a screenshot of the first AR interface may be created (e.g., the screenshot may comprise the first set of AR objects overlaid onto the real time view of the first camera of the first client device). Alternatively and/or additionally, responsive to a selection of the tenth selectable input, the first image may be selected for inclusion in the one or more emails. Alternatively and/or additionally, the first image may be generated and/or selected for inclusion in the one or more emails automatically (without a selection of the tenth selectable input).

Alternatively and/or additionally, an eleventh selectable input of the set of sharing selectable inputs may correspond to a fourth sharing option. The fourth sharing option may correspond to sharing a second image of the first edited set of AR objects (e.g., the final version of the first edited set of AR objects). In some examples, responsive to a selection of the eleventh selectable input, the second image of the first edited set of AR objects may be generated. For example, a screenshot of the first AR interface may be created (e.g., the screenshot may comprise the first edited set of AR objects (e.g., the final version of the first edited set of AR objects) overlaid onto the real time view of the first camera of the first client device). Alternatively and/or additionally, responsive to a selection of the eleventh selectable input, the second image may be selected for inclusion in the one or more emails. Alternatively and/or additionally, the second image may be generated and/or selected for inclusion in the one or more emails automatically (without a selection of the eleventh selectable input).

Alternatively and/or additionally, a twelfth selectable input of the set of sharing selectable inputs may correspond to a fourth sharing option. The fourth sharing option may correspond to sharing a first video of the first set of AR objects. For example, the first video may comprise a video representation of the first set of AR objects overlaid onto the real time view of the first camera of the first client device. In some examples, responsive to a selection of the twelfth selectable input, the first video may be generated. Alternatively and/or additionally, responsive to a selection of the twelfth selectable input, the first video may be selected for inclusion in the one or more emails. Alternatively and/or additionally, the first video may be generated and/or selected for inclusion in the one or more emails automatically (without a selection of the twelfth selectable input).

Alternatively and/or additionally, a thirteenth selectable input of the set of sharing selectable inputs may correspond to a fifth sharing option. The fifth sharing option may correspond to sharing a second video of the first edited set of AR objects (e.g., the final version of the first edited set of AR objects). For example, the second video may comprise a video representation of the first edited set of AR objects (e.g., the final version of the first edited set of AR objects) overlaid onto the real time view of the first camera of the first client device. In some examples, responsive to a selection of the thirteenth selectable input, the second video may be generated. Alternatively and/or additionally, responsive to a selection of the thirteenth selectable input, the second video may be selected for inclusion in the one or more emails. Alternatively and/or additionally, the second video may be generated and/or selected for inclusion in the one or more emails automatically (without a selection of the thirteenth selectable input).

Alternatively and/or additionally, a fourteenth selectable input of the set of sharing selectable inputs may correspond to a fifth sharing option. The fifth sharing option may correspond to sharing a presentation AR experience package. For example, the presentation AR experience package may comprise a plurality of sets of AR data corresponding to a plurality of versions of the first set of AR objects. For example, a first set of AR data of the plurality of sets of AR data may correspond to (an unedited version of) the first set of AR objects. Alternatively and/or additionally, other sets of AR data of the plurality of sets of AR data may correspond to versions of the first edited set of AR objects (e.g., a second set of AR data of the plurality of sets of AR data may correspond to the first version of the edited set of AR objects, a third set of AR data of the plurality of sets of AR data may correspond to the second version of the edited set of AR objects, etc.).

In some examples, responsive to a selection of the fourteenth selectable input, the presentation AR experience package may be generated. Alternatively and/or additionally, responsive to a selection of the fourteenth selectable input, the presentation AR experience package may be selected for inclusion in the one or more emails. Alternatively and/or additionally, the presentation AR experience package may be generated and/or selected for inclusion in the one or more emails automatically (without a selection of the fourteenth selectable input).

Alternatively and/or additionally, a fifteenth selectable input of the set of sharing selectable inputs may correspond to a sixth sharing option. The sixth sharing option may correspond to sharing a plurality of images corresponding to the plurality of versions of the first set of AR objects. In some examples, responsive to a selection of the fifteenth selectable input, the plurality of images may be generated. Alternatively and/or additionally, responsive to a selection of the fifteenth selectable input, a presentation comprising a plurality of slides may be generated. Each slide of the plurality of slides may comprise an image of the plurality of images. Alternatively and/or additionally, responsive to a selection of the fifteenth selectable input, the plurality of images and/or the presentation may be selected for inclusion in the one or more emails. Alternatively and/or additionally, the plurality of images and/or the presentation may be generated and/or selected for inclusion in the one or more emails automatically (without a selection of the fifteenth selectable input).

Alternatively and/or additionally, a sixteenth selectable input of the set of sharing selectable inputs may correspond to a seventh sharing option. The seventh sharing option may correspond to sharing a presentation video comprising a video representation of the plurality of versions of the first set of AR objects (e.g., the first set of AR objects and/or versions of the edited set of AR objects). For example, a process in which edits are made to the first set of AR objects may be shown in the presentation video. In some examples, responsive to a selection of the sixteenth selectable input, the presentation video may be generated. Alternatively and/or additionally, responsive to a selection of the sixteenth selectable input, the presentation video may be selected for inclusion in the one or more emails. Alternatively and/or additionally, the presentation video may be generated and/or selected for inclusion in the one or more emails automatically (without a selection of the sixteenth selectable input).

At 416, responsive to receiving the request to share the first edited set of AR objects with the one or more email accounts, the one or more emails may be transmitted to the one or more email accounts. In some examples, the second AR experience package, the third AR experience package, the first image, the second image, the first video, the second video, the presentation AR experience package, the plurality of images, the presentation and/or the presentation video may be accessible via each email of the one or more emails.

For example, each email of the one or more emails may comprise one or more download links corresponding to the second AR experience package, the third AR experience package, the first image, the second image, the first video, the second video, the presentation AR experience package, the plurality of images, the presentation and/or the presentation video. Alternatively and/or additionally, each email of the one or more emails may comprise one or more attachments comprising the second AR experience package, the third AR experience package, the first image, the second image, the first video, the second video, the presentation AR experience package, the plurality of images, the presentation and/or the presentation video.

In some examples, a fourth email account of the one or more email accounts may receive a second email of the one or more emails. For example, the second email may be accessed via a second email interface on a second client device associated with the fourth email account. In some examples, the second AR experience package, the third AR experience package, the first image, the second image, the first video, the second video, the presentation AR experience package, the plurality of images, the presentation and/or the presentation video may be accessed via the second email.

For example, responsive to a selection of a selectable input (e.g., a download link, an attachment, etc. within the second email) corresponding to the second AR experience package (corresponding to the first set of AR objects), a second AR interface may be opened using the second client device. A second real time view of a second camera of the second client device may be displayed using the second AR interface. The first set of AR objects may be overlaid onto the second real time view of the second camera. Alternatively and/or additionally, edits may be made to the first set of AR objects using the second AR interface. A second edited set of AR objects may be generated based upon the edits. The second edited set of AR objects may be shared with one or more other email accounts using the second email interface and/or the second AR interface.

Alternatively and/or additionally, responsive to a selection of a selectable input (e.g., a download link, an attachment, etc. within the second email) corresponding to the third AR experience package (corresponding to the first edited set of AR objects), the second AR interface may be opened using the second client device. The second real time view of the second camera of the second client device may be displayed using the second AR interface. The first edited set of AR objects may be overlaid onto the second real time view of the second camera. Alternatively and/or additionally, edits may be made to the first edited set of AR objects using the second AR interface. A third edited set of AR objects may be generated based upon the edits. The third edited set of AR objects may be shared with one or more other email accounts using the second email interface and/or the second AR interface.

Alternatively and/or additionally, responsive to a selection of a selectable input (e.g., a download link, an attachment, etc. within the second email) corresponding to the presentation AR experience package (corresponding to the plurality of versions of the first set of AR objects), the second AR interface may be opened using the second client device. The second real time view of the second camera of the second client device may be displayed using the second AR interface. Initially, the first set of AR objects may be overlaid onto the second real time view of the second camera. The first set of AR objects may then be replaced with the first version of the first edited set of AR objects. For example, the first version of the first edited set of AR objects may be overlaid onto the second real time view of the second camera rather than the first set of AR objects being overlaid onto the second real time view of the second camera.

In some examples, the first set of AR objects may be replaced with the first version of the first edited set of AR objects (automatically) responsive to a duration of time that the first set of AR objects is overlaid onto the second real time view of the second camera reaching a threshold duration of time. For example, the threshold duration of time may be 30 seconds (and/or a different duration of time). Accordingly, responsive to the first set of AR objects being displayed and/or overlaid onto the second real time view of the second camera for 30 seconds, the first set of AR objects may be replaced with the first version of the first edited set of AR objects (automatically).

Alternatively and/or additionally, the first set of AR objects may be replaced with the first version of the first edited set of AR objects (manually) responsive to receiving a request to replace the first set of AR objects with the first version of the first edited set of AR objects. For example, the request to replace the first set of AR objects with the first version of the first edited set of AR objects may be received via a selection of a selectable input (e.g., a forward selectable input, a next selectable input, etc.). Alternatively and/or additionally, the request to replace the first set of AR objects with the first version of the first edited set of AR objects may be received by detecting a swiping motion on a second touchscreen of the second client device.

In some examples, the plurality of versions of the first set of AR objects (e.g., the unedited version of the first set of AR objects, the first version of the first edited set of AR objects, the second version of the first edited set of AR objects, the third version of the first edited set of AR objects and/or the fourth (e.g., the final) version of the first edited set of AR objects and/or other versions of the first edited set of AR objects) may be overlaid onto the second real time view of the second camera consecutively (e.g., individually).

In the first example (where the first set of AR objects corresponds to the set of family room furniture), the first set of AR objects may comprise the first exemplary AR object (e.g., the representation of the couch), the second exemplary AR object (e.g., the representation of the coffee table) and/or the third exemplary AR object (e.g., the representation of the logo associated with the first entity). Alternatively and/or additionally, the first version of the first edited set of AR objects may comprise the first exemplary AR object, the second exemplary AR object, the third exemplary AR object and/or the additional AR object (e.g., the representation of the pillow set) (e.g., the additional AR object may be added to generate the first version of the first edited set of AR objects). Alternatively and/or additionally, the second version of the first edited set of AR objects may comprise the first exemplary AR object, the third exemplary AR object and/or the additional AR object (e.g., the second exemplary AR object (e.g., the representation of the coffee table) may be removed to generate the second version of the first edited set of AR objects).

Alternatively and/or additionally, the third version of the first edited set of AR objects may comprise an edited version of the second version of the first edited set of AR objects, where the first exemplary AR object (e.g., the representation of the couch) is the first color (e.g., brown) rather than the second color (e.g., grey). Alternatively and/or additionally, the final version of the first edited set of AR objects may comprise an edited version of the third version of the first edited set of AR objects, where the first exemplary AR object is the second exemplary size rather than the first exemplary size.

Accordingly, in the first example, responsive to a selection of the selectable input corresponding to the presentation AR experience, the first set of AR objects (e.g., the representation of the couch, the representation of the coffee table and/or the representation of the logo) may be overlaid onto the second real time view of the second camera. The first set of AR objects may (automatically and/or manually) be replaced with the first version of the first edited set of AR objects such that the first version of the first edited set of AR objects (e.g., the representation of the couch, the representation of the coffee table, the representation of the logo and/or the representation of the side-table) is overlaid onto the second real time view of the second camera. The first version of the first edited set of AR objects may (automatically and/or manually) be replaced with the second version of the first edited set of AR objects such that the second version of the first edited set of AR objects (e.g., the representation of the couch, the representation of the logo and/or the representation of the side-table) is overlaid onto the second real time view of the second camera.

The second version of the first edited set of AR objects may (automatically and/or manually) be replaced with the third version of the first edited set of AR objects such that the third version of the first edited set of AR objects (e.g., the representation of the couch having the first color rather than the first color, the representation of the logo and/or the representation of the side-table) is overlaid onto the second real time view of the second camera. The third version of the first edited set of AR objects may (automatically and/or manually) be replaced with the final version of the first edited set of AR objects such that the final version of the first edited set of AR objects (e.g., the representation of the couch having the second exemplary size rather than the first exemplary size, the representation of the logo and/or the representation of the side-table) is overlaid onto the second real time view of the second camera.

In some examples, a third email account of the one or more email accounts may receive a third email of the one or more emails. For example, the third email may be accessed via a third email interface on a third client device associated with the third email account. In some examples, the second AR experience package, the third AR experience package, the first image, the second image, the first video, the second video, the presentation AR experience package, the plurality of images, the presentation and/or the presentation video may be accessed via the third email.

However, a third email client associated with the third email interface and/or a third email service provider associated with the third email account may not have AR functionality and/or AR compatibility and/or may not enable AR experiences. For example, the second AR experience package, the third AR experience package and/or the presentation AR experience package may not be opened and/or implemented using the third email interface. In some examples, the third email may comprise an indication that when using email interfaces without AR functionality and/or compatibility, merely the first image, the second image, the first video, the second video, the plurality of images, the presentation and/or the presentation video may be used.

Alternatively and/or additionally, the third email may comprise an indication that the first email service provider, one or more email clients associated with the first email service provider and/or one or more email interfaces associated with the first email service provider provide AR functionality and/or AR compatibility and/or that the second AR experience package, the third AR experience package and/or the presentation AR experience package may be opened and/or implemented using an email account associated with the first email service provider, the one or more email clients associated with the first email service provider and/or the one or more email interfaces associated with the first email service provider.

For example, the third email may comprise a selectable input (e.g., a link) corresponding to setting up an email account, different than the third email account, with the first email service provider (and/or a different email service provider associated with AR functionality and/or AR compatibility). Alternatively and/or additionally, the third email may comprise a selectable input (e.g., a link) corresponding to using Internet Message Access Protocol (IMAP) to provide access to the third email account using an AR enabled email client that has AR functionality and/or AR compatibility. Accordingly, the AR enabled email client may access the third email and/or other emails associated with the third email account. The AR enabled email client may be used to open the second AR experience package, the third AR experience package and/or the presentation AR experience package (and/or other AR experience packages).

It may be appreciated that the first set of AR objects and/or the first experience package may be retrieved from a source different than the first email (and/or a different email). For example, the first set of AR objects may be downloaded from a content interface (e.g., a web platform providing for displaying and/or downloading content items, such as videos, images, AR objects, etc.). Alternatively and/or additionally, the first set of AR objects may be retrieved from an AR enabled image and/or an AR enabled video (e.g., an AR enabled movie, an AR enabled television show, an AR enabled advertisement video, an AR enabled advertisement image, etc.). For example, the AR enabled image and/or the AR enabled video may comprise one or more selectable inputs corresponding to retrieving an AR object (e.g., a representation of a character, a representation of a product, etc.) from the AR enabled image and/or the AR enabled video and/or interacting with the AR object (e.g., overlaying the AR object onto the real time view of the first camera, editing the AR object, sharing the AR object, etc.).

It may be appreciated that one or more of the techniques presented herein may be implemented using a communication platform different than an email platform (e.g., messaging platforms, browsers, social media platforms, etc.). For example, using one or more of the techniques presented herein, messages comprising AR experience packages may be transmitted and/or received by a user account. Sets of AR objects may be edited using messaging interfaces and/or social media interfaces having AR capabilities. Alternatively and/or additionally, edited sets of AR objects may be shared by transmitting messages comprising AR experience packages to user accounts.

FIGS. 5A-5L illustrate examples of a system 501 for presenting AR experiences and/or sharing AR objects. A first user, such as user Thomas, and/or a first client device 500 associated with the first user may access and/or interact with a communication system (e.g., an email system, messaging system, etc.) for sending and/or receiving emails and/or performing communications via messaging, voice calls, video calls, etc. For example, a first email account (and/or a different type of user account) of the first user with the communication system may be accessed and/or interacted with via a first email interface on the first client device 500. In some examples, the first email interface may be AR enabled (e.g., the first email interface may comprise a first AR interface for presenting AR objects). Alternatively and/or additionally, the first client device 500 may comprise a microphone 504, a speaker 506 and/or a button 502.

Figure 5A:
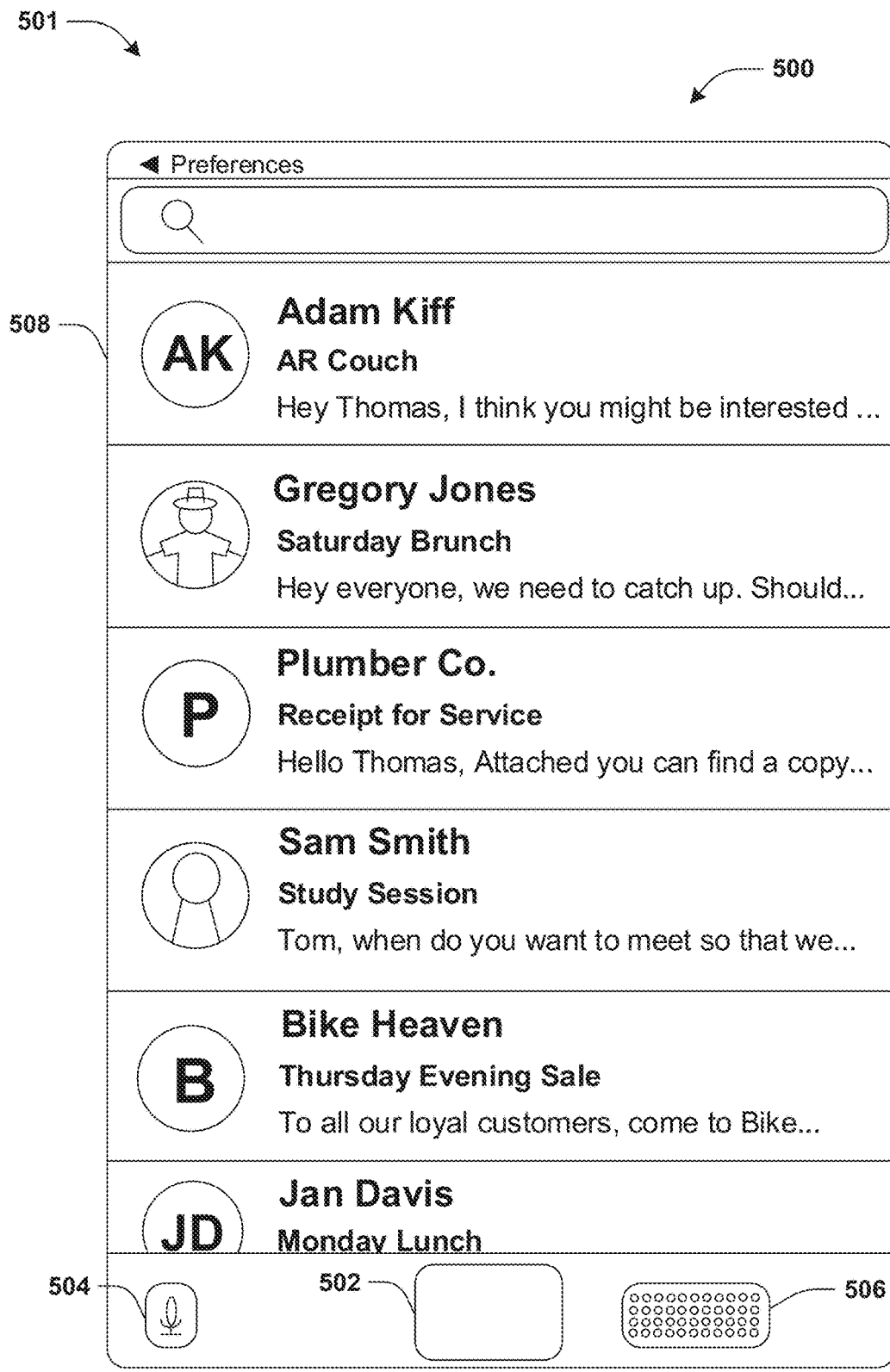
FIG. 5A is a component block diagram illustrating an example system for presenting AR experiences and/or sharing AR objects, where a graphical user interface of a first client device is controlled to display a first email interface.

FIG. 5A illustrates a graphical user interface of the first client device 500 being controlled to display the first email interface. For example, the first email interface may display a list of emails (e.g., an inbox associated with the first email account) comprising a plurality of email representations. For example, the list of emails may comprise a first email representation 508 corresponding to a first email received from a second email account. For example, responsive to a selection of the first email representation 508, the first email may be displayed by the first email interface.

Figure 5B:
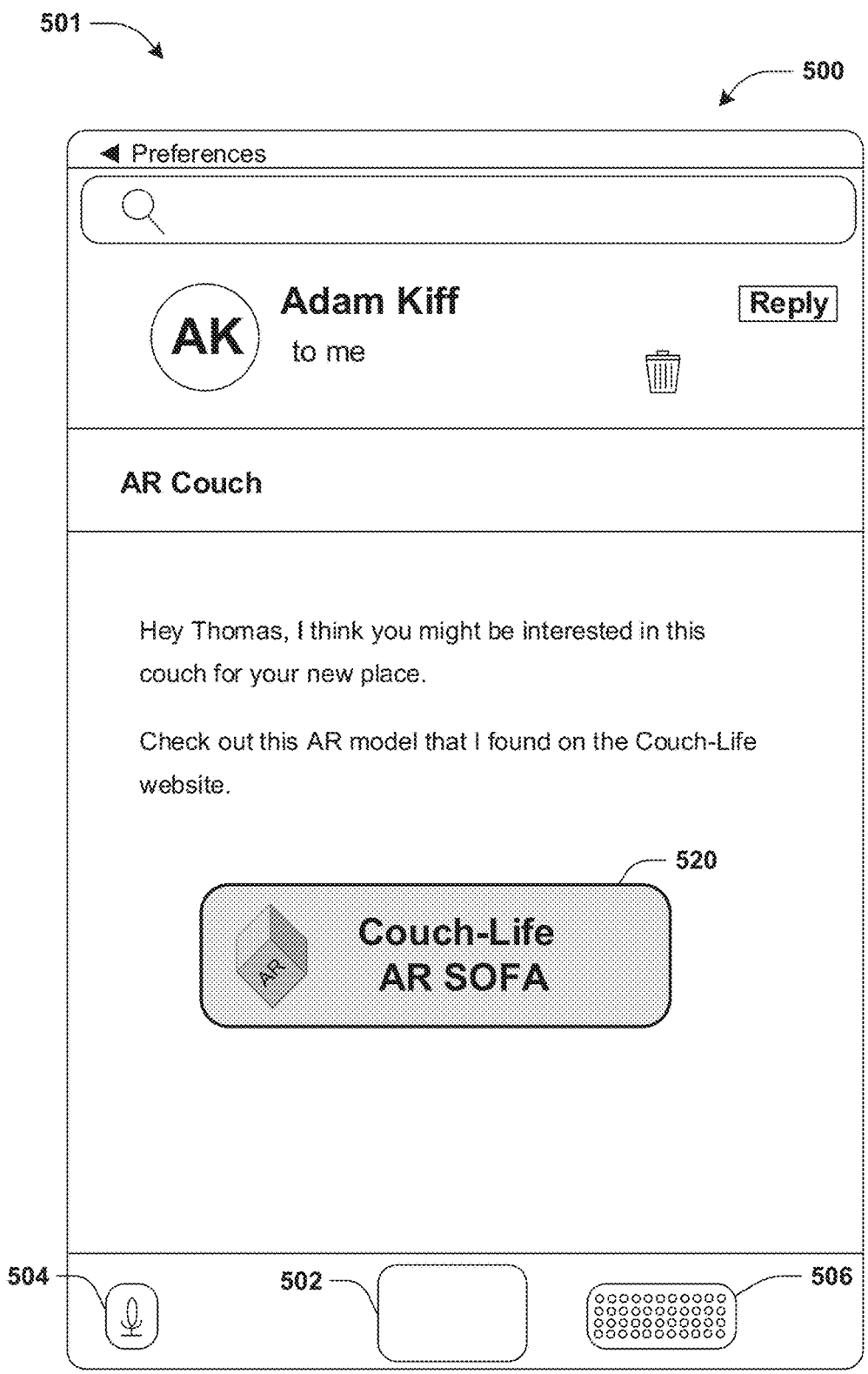
FIG. 5B is a component block diagram illustrating an example system for presenting AR experiences and/or sharing AR objects, where a graphical user interface of a first client device is controlled to display an email.

FIG. 5B illustrates the graphical user interface of the first client device 500 being controlled to display the first email. In some examples, the first email may comprise a first selectable input 520 corresponding to initiating a first AR experience associated with a first set of AR objects 536 (illustrated in FIG. 5D). Responsive to a selection of the first selectable input 520, a first AR experience package comprising AR data corresponding to the first set of AR objects 536 may be downloaded to the first client device 500 and/or opened using the first client device 500. For example, a request to initiate the first AR experience may be received (from the first client device 500) via a selection of the first selectable input 520. The first AR experience package may be downloaded to the first client device 500. In some examples, responsive to receiving the request to initiate the first AR experience (and/or responsive to downloading the first AR experience package to the first client device), the first AR interface, associated with the first email interface, may be opened using the first client device 500.

Figure 5C:
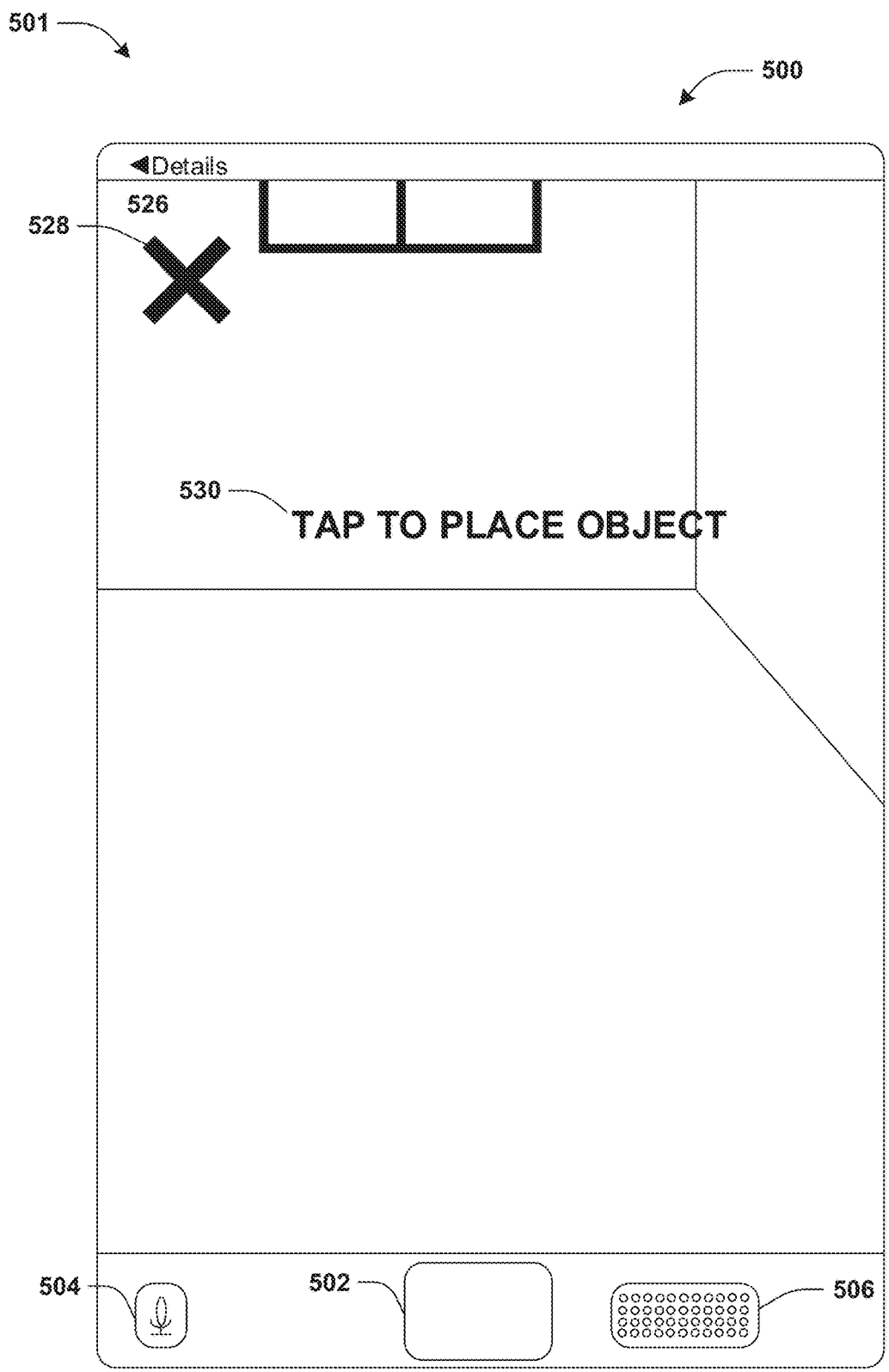
FIG. 5C is a component block diagram illustrating an example system for presenting AR experiences and/or sharing AR objects, where a graphical user interface of a first client device is controlled to display a first AR interface.

FIG. 5C illustrates the graphical user interface of the first client device 500 being controlled to display the first AR interface. For example, the first AR interface may display an exit selectable input 528 corresponding to exiting the first AR interface. In some examples, the first AR interface may display a real time view 526 of a first camera of the first client device 500. Alternatively and/or additionally, the first AR interface may display a first instruction 530 "TAP TO PLACE OBJECT". For example, responsive to a selection of a location on the real time view 526 of the first camera (e.g., via tapping on a portion of a touchscreen of the first client device 500 corresponding to the location), the first set of AR objects 536 may be overlaid onto the real time view 526 of the first camera (at the location).

Figure 5D:
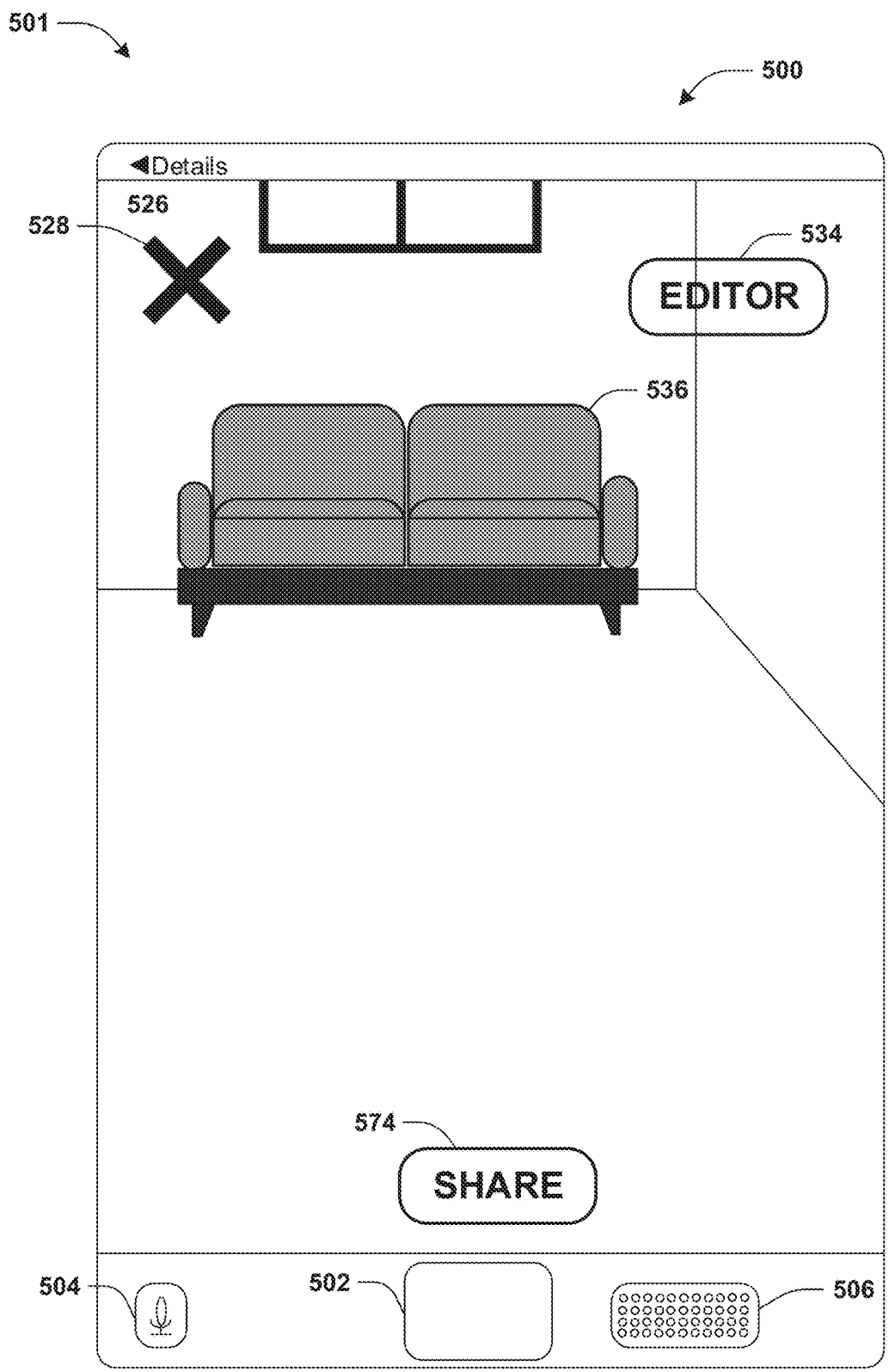
FIG. 5D is a component block diagram illustrating an example system for presenting AR experiences and/or sharing AR objects, where a graphical user interface of a first client device is controlled to display a first AR interface and/or a first set of AR objects is overlaid onto a real time view of a first camera.

FIG. 5D illustrates the graphical user interface of the first client device 500 being controlled to display the first AR interface, where the first set of AR objects 536 is overlaid onto the real time view 526 of the first camera. For example, the first set of AR objects 536 may comprise a first AR object (e.g., a representation of a couch). In some examples, the first AR interface may display an editor selectable input 534 corresponding to editing the first set of AR objects 536. For example, responsive to a selection of the editor selectable input 534, a plurality of edit selectable inputs may be displayed.

Figure 5E:
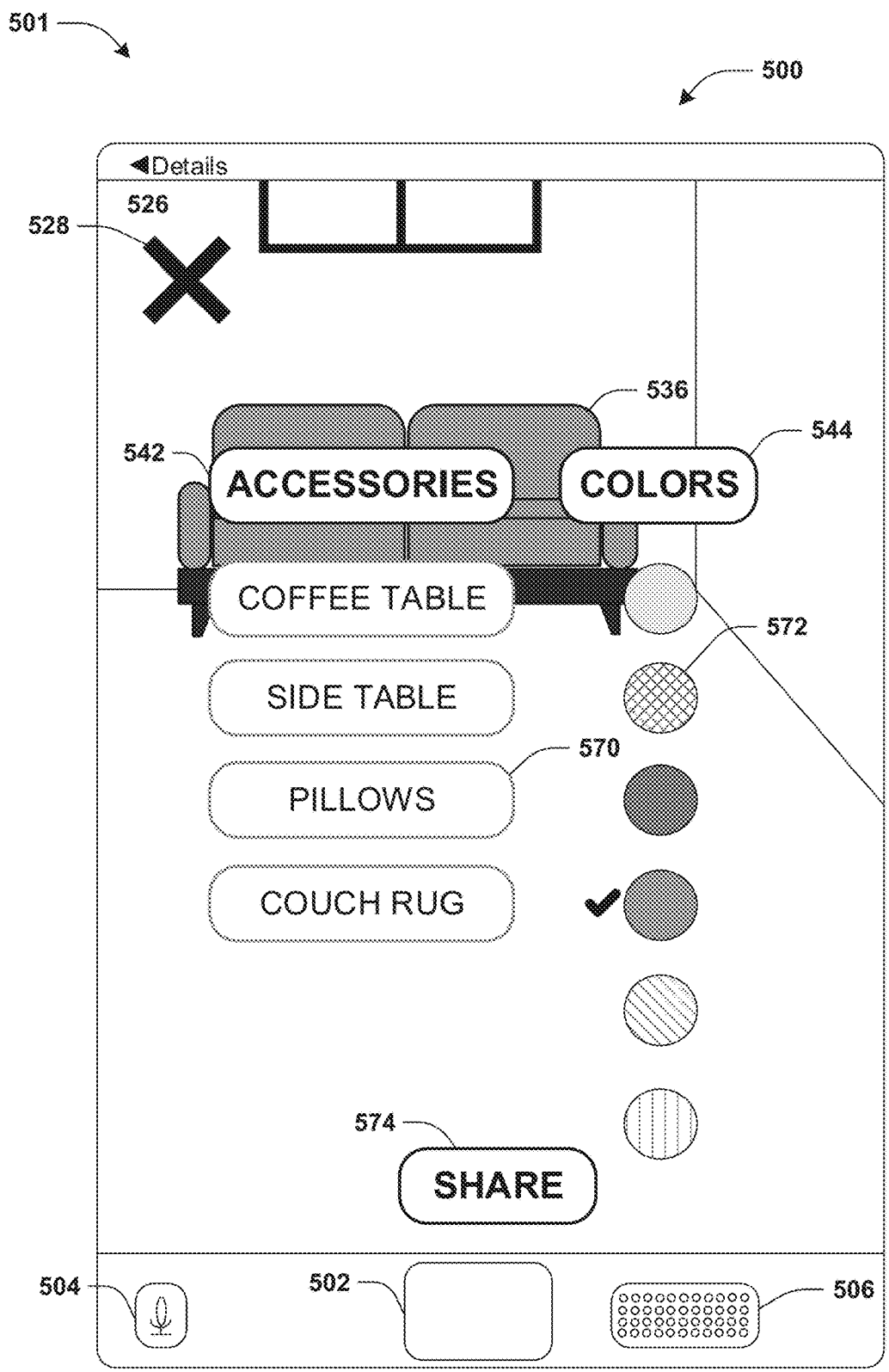
FIG. 5E is a component block diagram illustrating an example system for presenting AR experiences and/or sharing AR objects, where a graphical user interface of a first client device is controlled to display a first AR interface and/or a plurality of edit selectable inputs is displayed.

FIG. 5E illustrates the graphical user interface of the first client device 500 being controlled to display the first AR interface, where the plurality of edit selectable inputs is displayed. For example, the plurality of edit selectable inputs may comprise a first set of selectable inputs 542 corresponding to a list of additional AR objects. Alternatively and/or additionally, the plurality of edit selectable inputs may comprise a second set of selectable inputs 544 corresponding to a list of colors. For example, a check mark may be displayed adjacent to a first exemplary selectable input, of the second set of selectable inputs 544, corresponding to a first color of the first set of AR objects 536 (e.g., the first AR object may correspond to the first color).

In some examples, a selection of a second exemplary selectable input 572 of the second set of selectable inputs 544 may be received. For example, the second exemplary selectable input 572 may correspond to a second color, different than the first color. For example, responsive to the selection of the second exemplary selectable input 572 corresponding to the second color, a first version of an edited set of AR objects 514 (illustrated in FIG. 5F) may be generated based upon the second color (e.g., the first AR object may be the second color in the first version of the edited set of AR objects 514).

Figure 5F:
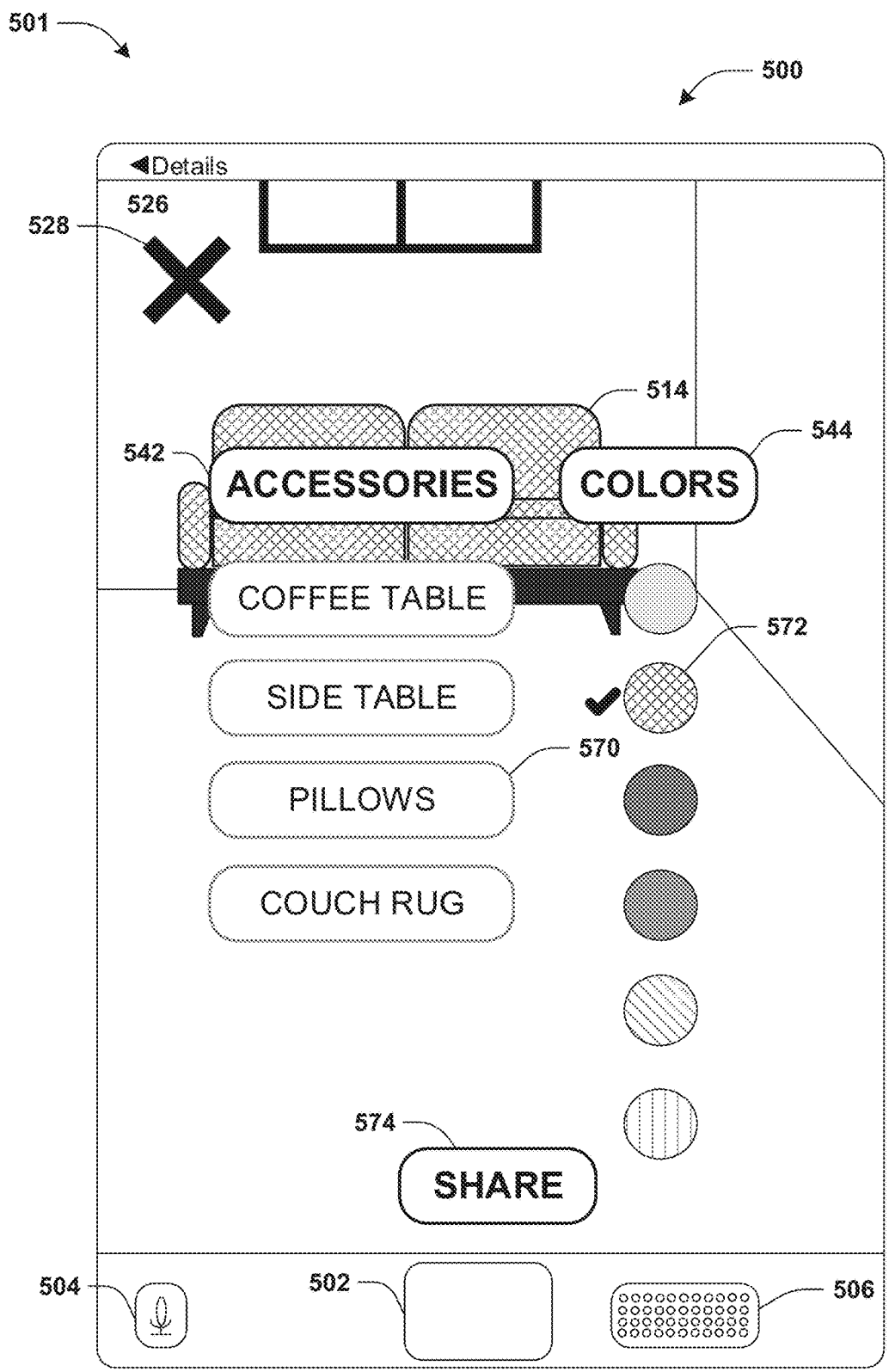
FIG. 5F is a component block diagram illustrating an example system for presenting AR experiences and/or sharing AR objects, where a graphical user interface of a first client device is controlled to display a first AR interface and/or a first version of an edited set of AR objects is overlaid onto a real time view of a first camera.

FIG. 5F illustrates the graphical user interface of the first client device 500 being controlled to display the first AR interface, where the first version of the edited set of AR objects 514 is overlaid onto the real time view 526 of the first camera. Alternatively and/or additionally, a selection of a third exemplary selectable input 570 of the first set of selectable inputs 542 may be received. For example, the third exemplary selectable input 570 may correspond to adding an additional AR object (e.g., a representation of pillows) to the first version of the edited set of AR objects 514. For example, responsive to the selection of the third exemplary selectable input 570 corresponding to the additional AR object, a second version of the edited set of AR objects 516 (illustrated in FIG. 5G) may be generated based upon the additional AR object (e.g., the second version of the edited set of AR objects 516 may comprise the additional AR object).

Figure 5G:
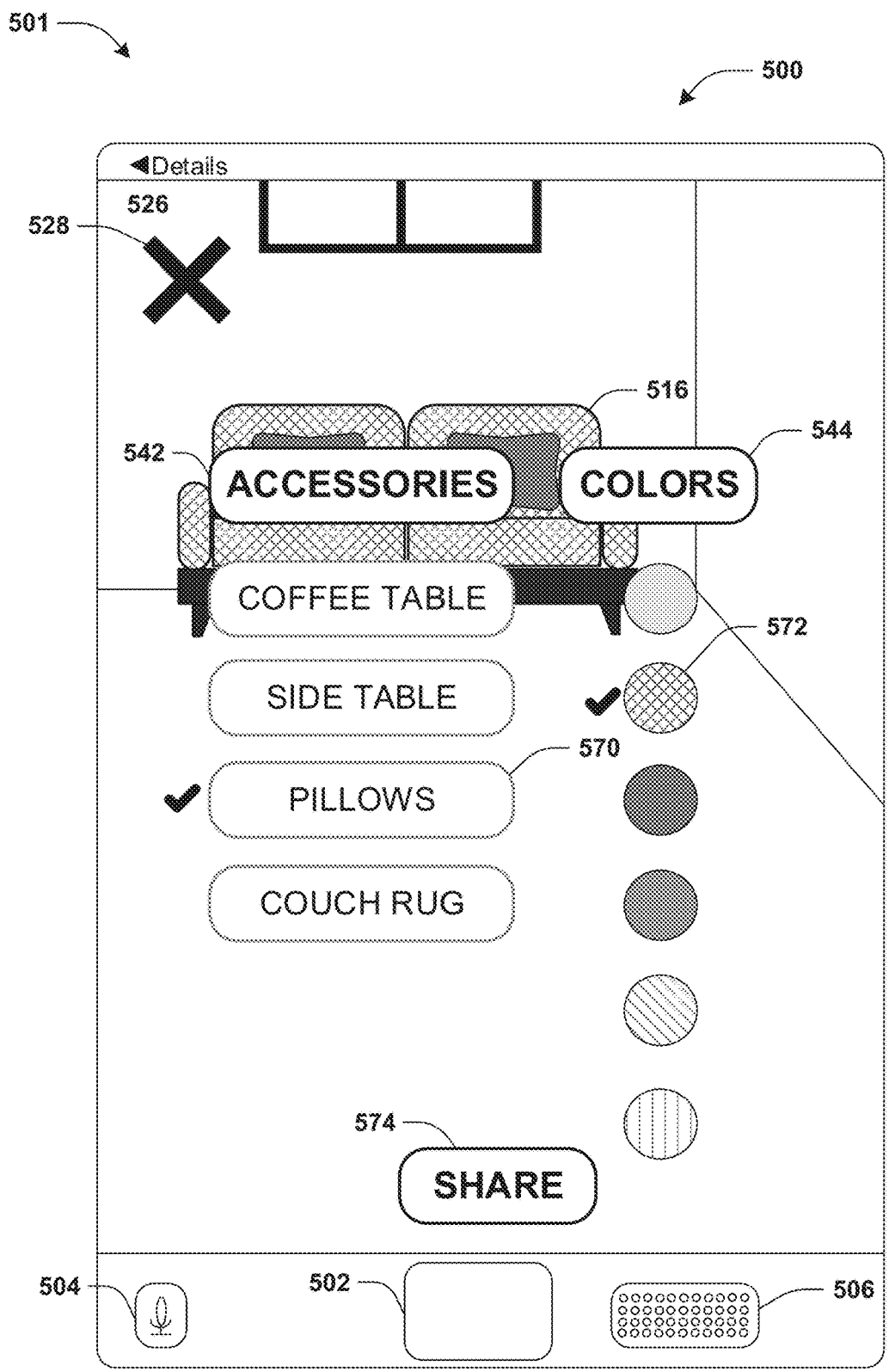
FIG. 5G is a component block diagram illustrating an example system for presenting AR experiences and/or sharing AR objects, where a graphical user interface of a first client device is controlled to display a first AR interface and/or a second version of an edited set of AR objects is overlaid onto a real time view of a first camera.

FIG. 5G illustrates the graphical user interface of the first client device 500 being controlled to display the first AR interface, where the second version of the edited set of AR objects 516 is overlaid onto the real time view 526 of the first camera. Alternatively and/or additionally, a request to share the second version of the edited set of AR objects 516 with one or more email accounts may be received via a selection of a share selectable input 574. For example, responsive to the selection of the share selectable input 574, a share interface 576 (illustrated in FIG. 5H) may be displayed.

Figure 5H:
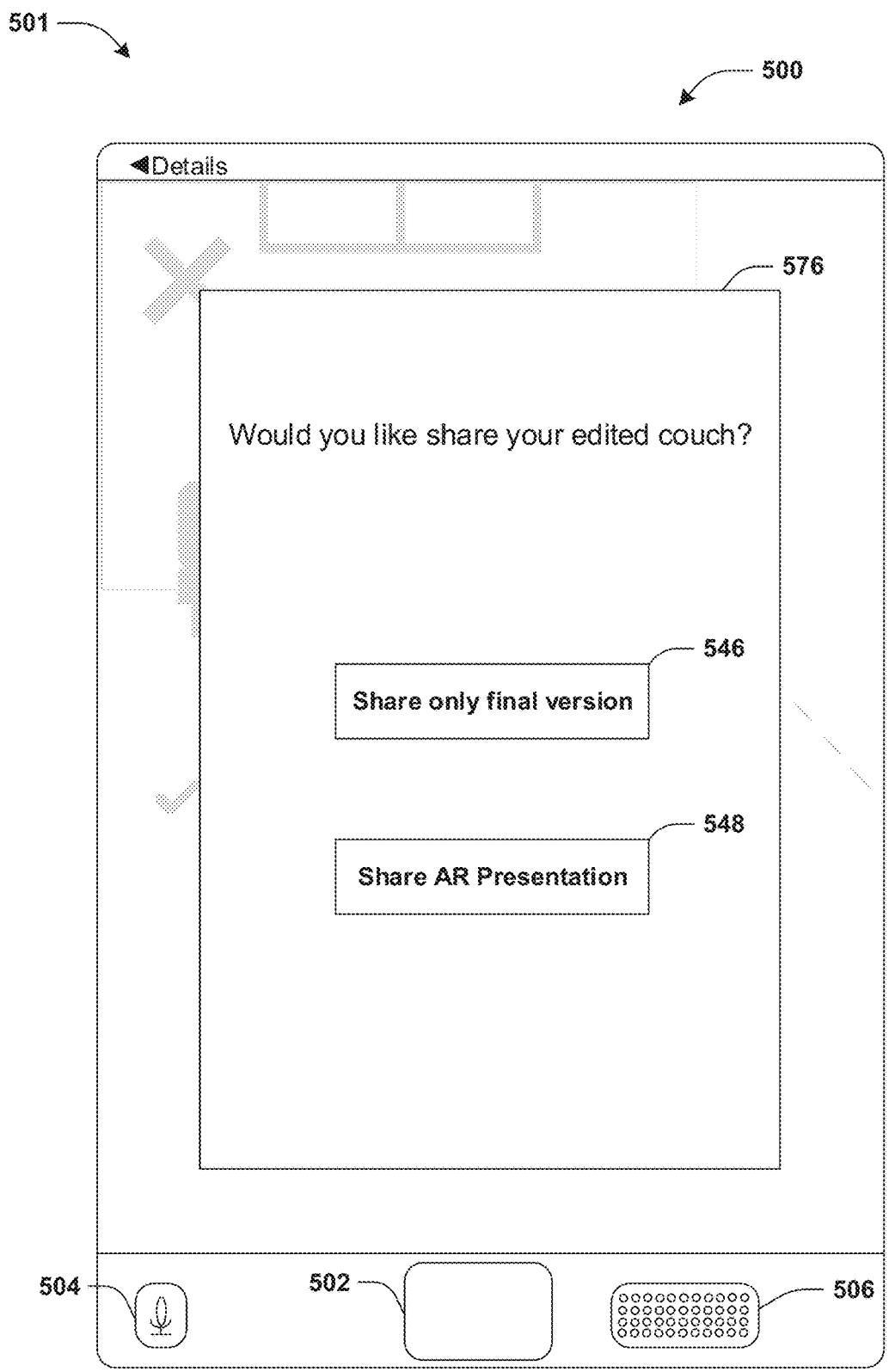
FIG. 5H is a component block diagram illustrating an example system for presenting AR experiences and/or sharing AR objects, where a graphical user interface of a first client device is controlled to display a share interface.

FIG. 5H illustrates the graphical user interface of the first client device 500 being controlled to display the share interface 576. For example, the share interface 576 may comprise a second selectable input 546 corresponding to sharing a second AR experience package comprising AR data corresponding to the second version of the edited set of AR objects 516. Alternatively and/or additionally, the share interface 576 may comprise a third selectable input 548 corresponding to sharing a presentation AR experience package comprise AR data corresponding to the first set of AR objects 536, the first version of the edited set of AR objects 514 and/or the second version of the edited set of AR objects 516. In some examples, a selection of the third selectable input 548 may be received.

Figure 5I:
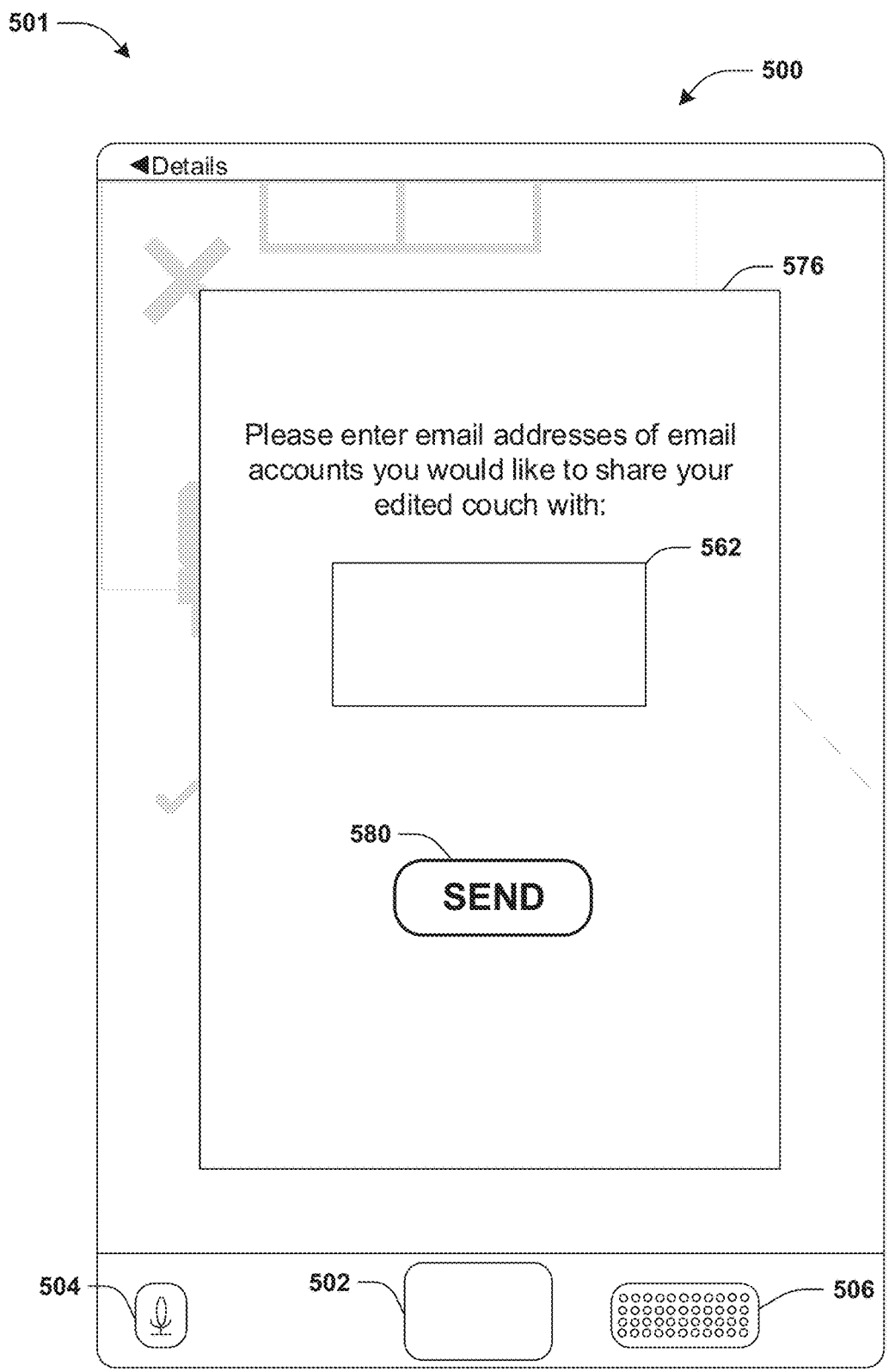
FIG. 5I is a component block diagram illustrating an example system for presenting AR experiences and/or sharing AR objects, where a graphical user interface of a first client device is controlled to display a share interface and/or a first text area is displayed.

FIG. 5I illustrates the graphical user interface of the first client device 500 being controlled to display the share interface 576, where a first text area 562 is displayed. For example, indications of the one or more email accounts may be inputted into the text area 562 (e.g., one or more email addresses associated with the one or more email accounts may be inputted into the text area 562). Alternatively and/or additionally, a request to transmit one or more emails, comprising the presentation AR experience package, to the one or more email accounts may be received via a selection of a send selectable input 580.

Alternatively and/or additionally, responsive to receiving the selection of the third selectable input 548, an email drafting interface of the first email interface may be opened. For example, indications of the one or more email accounts (e.g., email addresses) may be entered into one or more email header fields corresponding to recipients using the email drafting interface. Alternatively and/or additionally, the presentation AR experience package (and/or a download link corresponding to the presentation AR experience package) may be included in an email body field of the email drafting interface (automatically). Alternatively and/or additionally, the request to transmit the one or more emails to the one or more email accounts may be received via the email drafting interface.

In some examples, responsive to receiving the request to transmit the one or more emails to the one or more email accounts, the one or more emails may be transmitted to the one or more email accounts. In some examples, a third email account of the one or more email accounts may receive a second email of the one or more emails. For example, the second email may be accessed via a second email interface on a second client device 550 (illustrated in FIG. 5J) associated with the third email account. In some examples, the presentation AR experience package may be accessed via the second email. For example, responsive to a selection of a selectable input (e.g., a download link, an attachment, etc. within the second email) corresponding to the presentation AR experience package, a second AR interface may be opened using the second client device 550.

Figure 5J:
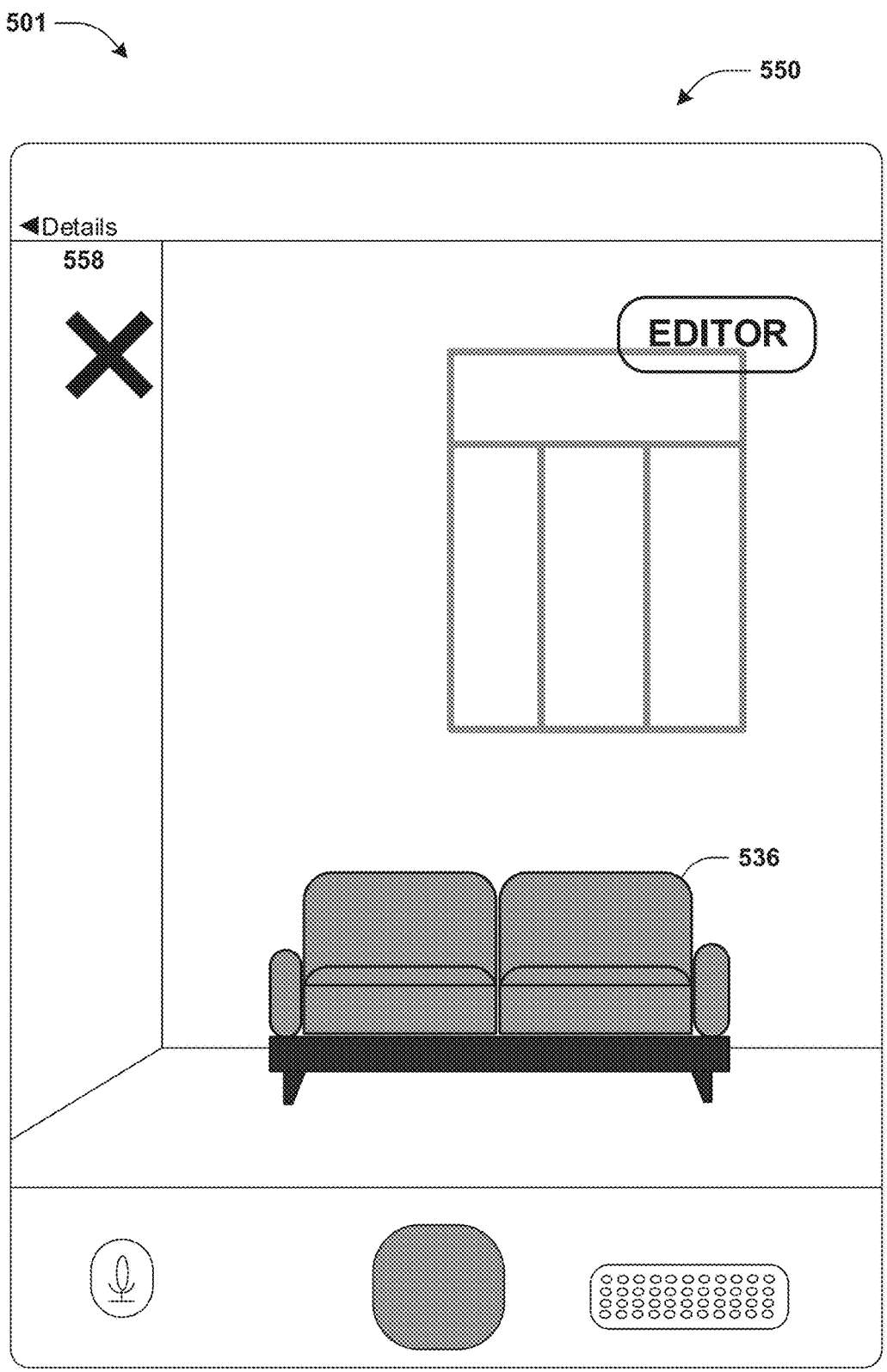
FIG. 5J is a component block diagram illustrating an example system for presenting AR experiences and/or sharing AR objects, where a second graphical user interface of a second client device is controlled to display a second AR interface.

FIG. 5J illustrates a second graphical user interface of the second client device 550 being controlled to display the second AR interface. For example, a second real time view 558 of a second camera of the second client device 550 may be displayed using the second AR interface. The first set of AR objects 536 may be overlaid onto the second real time view 558 of the second camera. The first set of AR objects 536 may then be replaced with the first version of the first edited set of AR objects 514. For example, the first version of the first edited set of AR objects 514 may be overlaid onto the second real time view 558 of the second camera rather than the first set of AR objects 536 being overlaid onto the second real time view 558 of the second camera.

In some examples, the first set of AR objects 514 may be replaced with the first version of the first edited set of AR objects 514 (automatically) responsive to a duration of time that the first set of AR objects 536 is overlaid onto the second real time view 558 of the second camera reaching a threshold duration of time. Alternatively and/or additionally, the first set of AR objects 536 may be replaced with the first version of the first edited set of AR objects 514 (manually) responsive to receiving a request to replace the first set of AR objects 536 with the first version of the first edited set of AR objects 514 (e.g., detecting a swiping motion on a second touchscreen of the second client device 550).

Figure 5K:
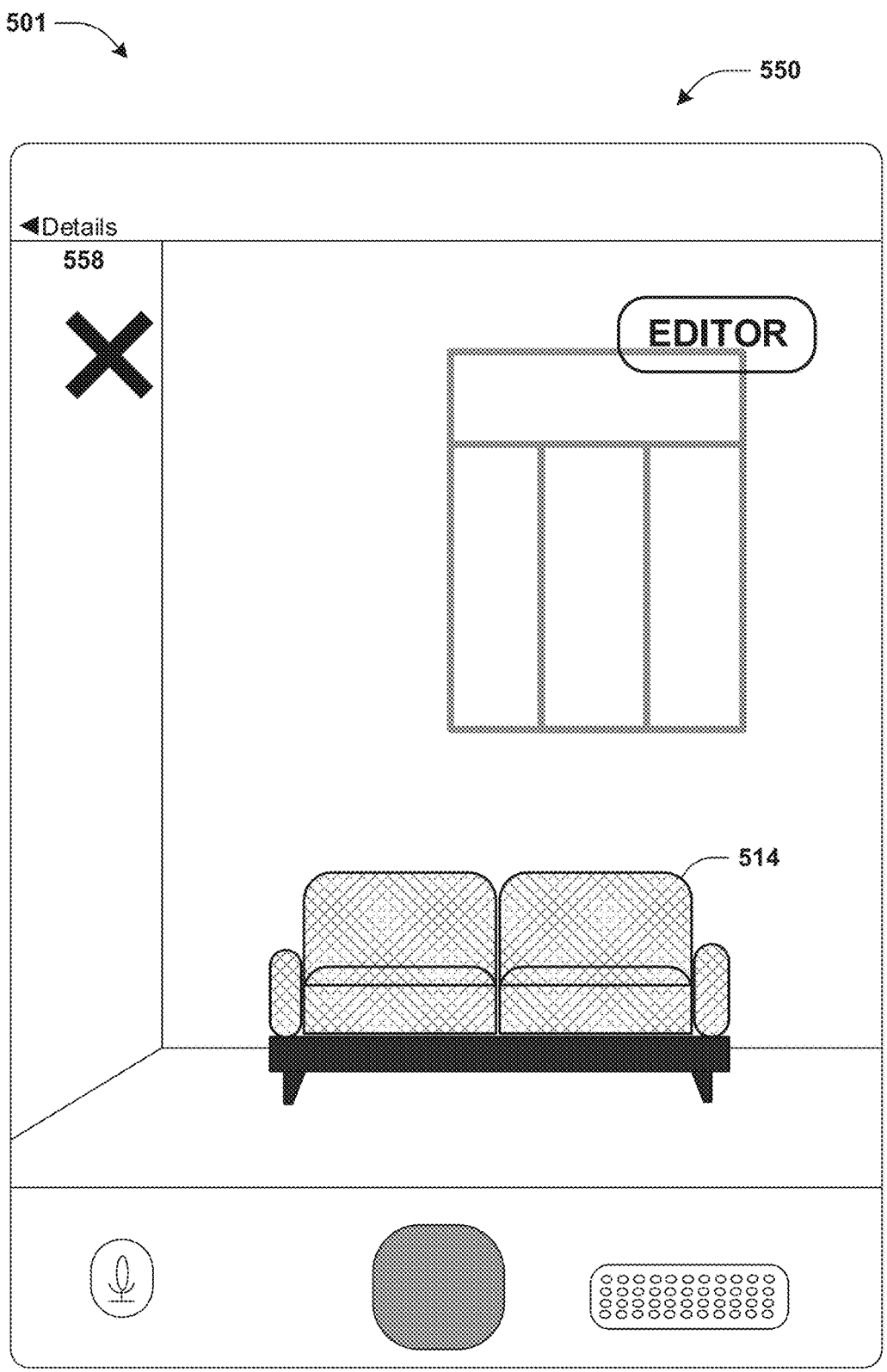
FIG. 5K is a component block diagram illustrating an example system for presenting AR experiences and/or sharing AR objects, where a second graphical user interface of a second client device is controlled to display a second AR interface and/or a first version of a first edited set of AR objects is overlaid onto a second real time view of a second camera.

FIG. 5K illustrates the second graphical user interface of the second client device 550 being controlled to display the second AR interface, where the first version of the first edited set of AR objects 514 is overlaid onto the second real time view 558 of the second camera. The first version of the first edited set of AR objects 514 may then be replaced with the second version of the first edited set of AR objects 516 (automatically and/or manually). For example, the second version of the first edited set of AR objects 516 may be overlaid onto the second real time view 558 of the second camera rather than the first version of the first edited set of AR objects 514 being overlaid onto the second real time view 558 of the second camera.

Figure 5L:
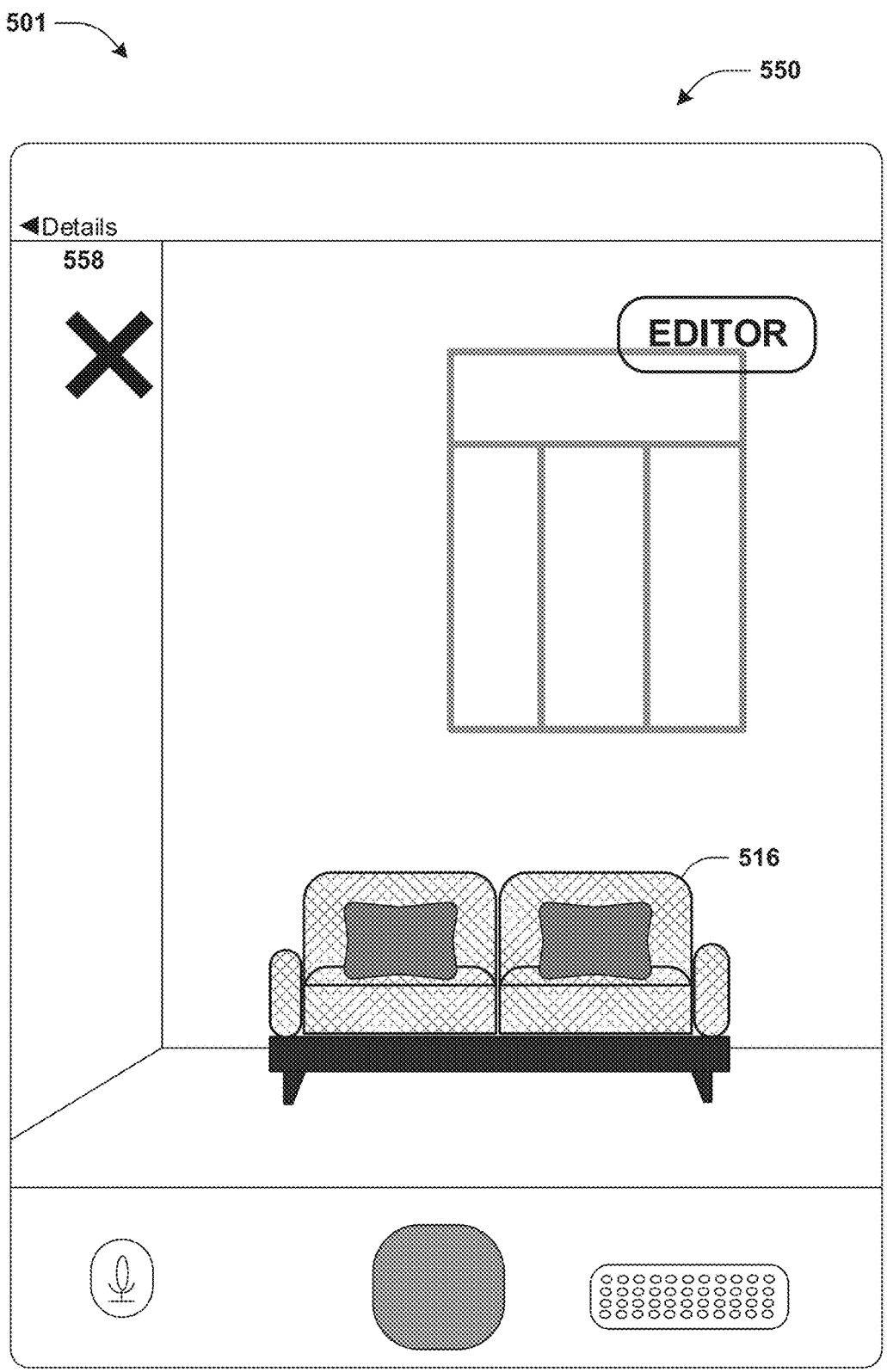
FIG. 5L is a component block diagram illustrating an example system for presenting AR experiences and/or sharing AR objects, where a second graphical user interface of a second client device is controlled to display a second AR interface and/or a second version of a first edited set of AR objects is overlaid onto a second real time view of a second camera.

FIG. 5L illustrates the second graphical user interface of the second client device 550 being controlled to display the second AR interface, where the second version of the first edited set of AR objects 516 is overlaid onto the second real time view 558 of the second camera.

It may be appreciated that the disclosed subject matter may assist a user (e.g., and/or a client device associated with the user) in viewing, interacting with, editing and/or sharing AR objects using a communication interface. Alternatively and/or additionally, the disclosed subject matter may assist the user in determining a significance of and/or developing an understanding of content associated with the AR objects by interacting with the AR objects using an AR interface of the communication interface.

Implementation of at least some of the disclosed subject matter may lead to benefits including, but not limited to, a reduction in screen space and/or an improved usability of a display (e.g., of the client device) (e.g., as a result of enabling the user and/or the client device to display and/or interact with AR objects that are comprised within emails using an email interface, wherein the user may not need to open a separate application in order to display and/or interact with the AR objects, etc.).

Alternatively and/or additionally, implementation of at least some of the disclosed subject matter may lead to benefits including a reduction in screen space and/or an improved usability of the display (e.g., as a result of enabling the user and/or the client device to edit an AR object using the email interface and/or the AR interface of the email interface, wherein the user the user may not need to open a separate application in order to edit the AR object, etc.).

Alternatively and/or additionally, implementation of at least some of the disclosed subject matter may lead to benefits including a reduction in screen space and/or an improved usability of the display (e.g., as a result of enabling the user and/or the client device to share the AR object from within the email interface, as a result of automatically generating an AR experience package comprising data corresponding to the AR object responsive to receiving a request to share the AR object, wherein the user the user may not need to open a separate application in order to share the AR object, etc.).

Alternatively and/or additionally, implementation of at least some of the disclosed subject matter may lead to benefits including a reduction in bandwidth (e.g., as a result of reducing a need for the user to a need for the user to download and/or install a separate application in order to display, interact with, edit and/or share the AR object).

Alternatively and/or additionally, implementation of at least some of the disclosed subject matter may lead to benefits including a reduction in power consumption (e.g., as a result of the user spending less time interacting with, viewing, editing and/or sharing the AR object, as a result of providing a more efficient interface for interacting with, viewing, editing and/or sharing the AR object, as a result of a reduction of transmission and/or reception of data, as a result of reducing a need for the user to download and/or open a separate application, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
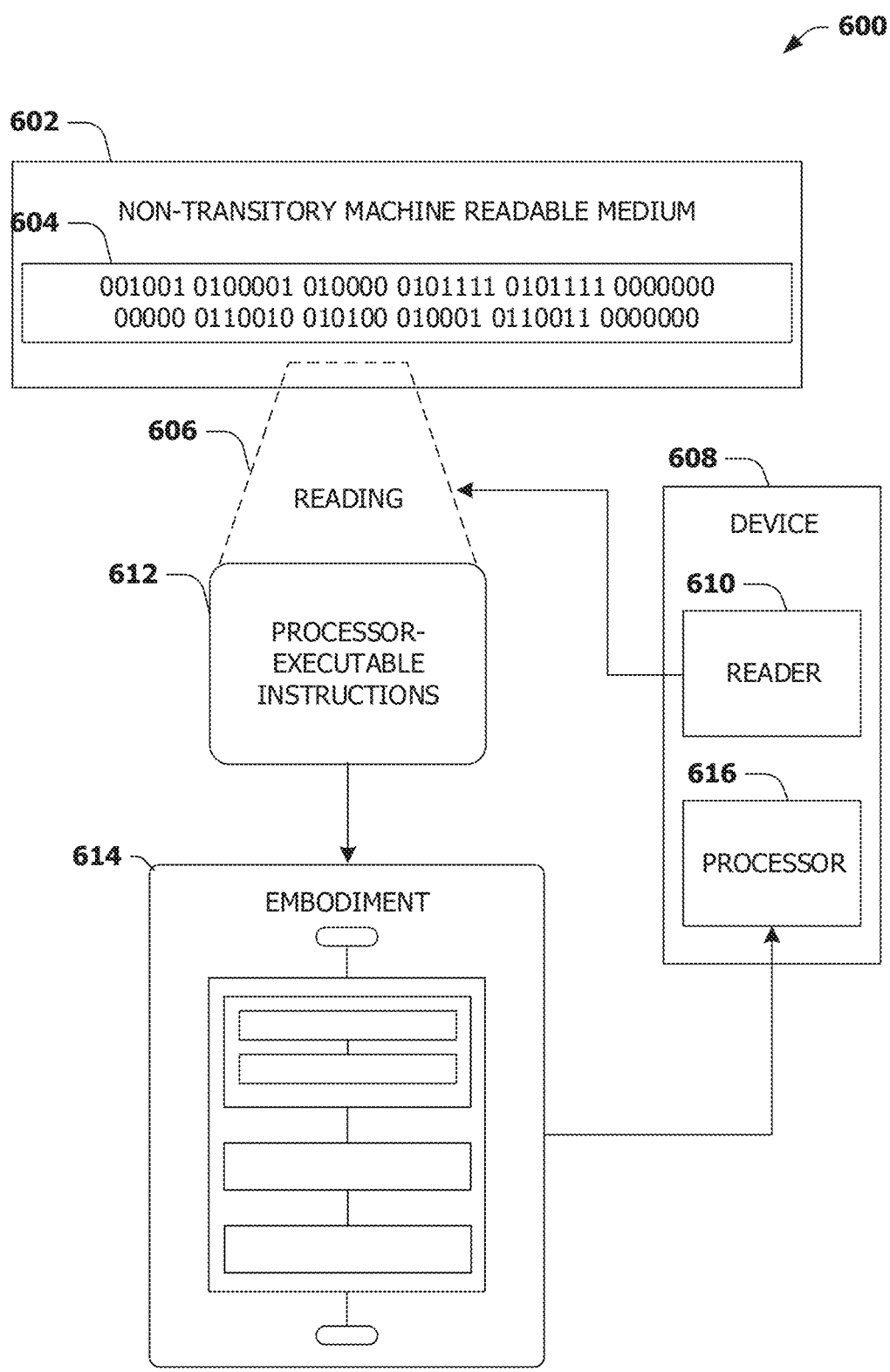
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5L, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
controlling a graphical user interface of a first client device, associated with a first email account, to display a first email interface comprising a first email;
receiving, via a selection of a first selectable input comprised within the first email, a request to initiate an augmented reality (AR) experience associated with a set of AR objects associated with a first version of AR objects;
responsive to receiving the request to initiate the AR experience, opening an AR interface using the first client device;
displaying a real time view of a camera of the first client device using the AR interface, wherein the set of AR objects are overlaid onto the real time view of the camera;
receiving one or more inputs corresponding to one or more edits to the set of AR objects;
generating an edited set of AR objects, associated with a second version of AR objects, based upon the set of AR objects and the one or more inputs, wherein the edited set of AR objects are overlaid onto the real time view of the camera;
receiving a second request to share the edited set of AR objects with one or more email accounts; and
responsive to receiving the second request to share the edited set of AR objects with the one or more email accounts, transmitting one or more emails providing access to a presentation video to the one or more email accounts, wherein the presentation video comprises a video representation of a process of applying the one or more edits to the set of AR objects associated with the first version of AR objects to generate the edited set of AR objects associated with the second version of AR objects.

2. The method of claim 1, comprising:
responsive to an input, of the one or more inputs, corresponding to adding an additional AR object to the set of AR objects, adding the additional AR object to the set of AR objects to generate the edited set of AR objects.

3. The method of claim 2, wherein the additional AR object is a representation of a set of text.

4. The method of claim 1, comprising:
responsive to an input, of the one or more inputs, corresponding to removing an AR object from the set of AR objects, removing the AR object from the set of AR objects to generate the edited set of AR objects.

5. The method of claim 1, comprising:
responsive to an input, of the one or more inputs, corresponding to changing a color of an AR object of the set of AR objects, changing the AR object from a first color to a second color to generate the edited set of AR objects.

6. The method of claim 1, comprising:
responsive to an input, of the one or more inputs, corresponding to changing a size of an AR object of the set of AR objects, changing the AR object from a first size to a second size to generate the edited set of AR objects.

7. The method of claim 1, comprising:
generating the presentation video based upon the set of AR objects and the edited set of AR objects.

8. The method of claim 1, wherein the one or more emails comprise a link to the presentation video.

9. The method of claim 1, wherein the one or more emails comprise an attachment comprising the presentation video.

10. The method of claim 1, comprising:
generating a content item comprising a video comprising a representation of the edited set of AR objects overlaid onto the real time view of the camera.

11. The method of claim 1, comprising:
generating a content item comprising an image comprising a representation of the edited set of AR objects overlaid onto the real time view of the camera.

12. The method of claim 11, wherein the one or more emails comprise the content item.

13. A computing device comprising:
a processor; and
memory comprising processor-executable instructions that when executed by the processor cause performance of operations, the operations comprising:
controlling a graphical user interface of a first client device, associated with a first email account, to display a first email interface comprising a first email;
receiving, via a selection of a first selectable input comprised within the first email, a request to initiate an augmented reality (AR) experience associated with a set of AR objects associated with a first version of AR objects;
responsive to receiving the request to initiate the AR experience, opening an AR interface using the first client device;
displaying a real time view of a camera of the first client device using the AR interface, wherein the set of AR objects are overlaid onto the real time view of the camera;
receiving a second request to share the set of AR objects with one or more email accounts; and
responsive to receiving the second request to share the set of AR objects with the one or more email accounts, transmitting one or more emails providing access to a presentation video to the one or more email accounts, wherein the presentation video comprises a video representation of a process of applying one or more edits to the set of AR objects associated with the first version of AR objects to generate an edited set of AR objects associated with a second version of AR objects.

14. The computing device of claim 13, the operations comprising:
generating the presentation video based upon the set of AR objects.

15. The computing device of claim 13, wherein the one or more emails comprise at least one of a link to the presentation video or an attachment comprising the presentation video.

16. The computing device of claim 13, the operations comprising:
generating a content item, comprising at least one of:
a video comprising a representation of the set of AR objects overlaid onto the real time view of the camera; or
an image comprising a representation of the set of AR objects overlaid onto the real time view of the camera.

17. The computing device of claim 16, wherein the one or more emails comprise the content item.

18. A non-transitory machine readable medium having stored thereon processor-executable instructions that when executed cause performance of operations, the operations comprising:

controlling a graphical user interface of a first client device, associated with a first user account, to display a first communication interface comprising a first message;

receiving, via a selection of a first selectable input comprised within the first message, a request to initiate an augmented reality (AR) experience associated with a set of AR objects associated with a first version of AR objects;

responsive to receiving the request to initiate the AR experience, opening an AR interface using the first client device;

displaying a real time view of a camera of the first client device using the AR interface, wherein the set of AR objects are overlaid onto the real time view of the camera;

receiving a second request to share the set of AR objects with one or more user accounts; and responsive to receiving the second request to share the set of AR objects with the one or more user accounts, transmitting one or more messages providing access to a presentation video to the one or more user accounts, wherein the presentation video comprises a video representation of a process of applying one or more edits to the set of AR objects associated with the first version of AR objects to generate an edited set of AR objects associated with a second version of AR objects.

19. The non-transitory machine readable medium of claim 18, the operations comprising:

generating the presentation video based upon the set of AR objects.

20. The non-transitory machine readable medium of claim 18, wherein the one or more messages comprise at least one of a link to the presentation video or an attachment comprising the presentation video.

* * * * *